United States Patent
Mathey et al.

[11] Patent Number: 5,944,383
[45] Date of Patent: Aug. 31, 1999

[54] EASY ENTRY SEAT TRACK ASSEMBLY WITH FULL MEMORY

[75] Inventors: Tom Owen Mathey, Rockton, Ill.; Mark R. Truman, Troy, Mich.; Christopher George Pasternak, Mishawaka, Ind.; Stanley D. Pacolt, Wixom, Mich.

[73] Assignee: Dura Automotive Systems, Inc., Elkhart, Ind.

[21] Appl. No.: 08/951,872

[22] Filed: Oct. 17, 1997

[51] Int. Cl.⁶ .................................................. B60N 2/08
[52] U.S. Cl. .................... 297/341; 297/344.1; 248/429
[58] Field of Search ................................ 297/341, 344.1; 248/429

[56] References Cited

U.S. PATENT DOCUMENTS

| | | | |
|---|---|---|---|
| 3,258,240 | 6/1966 | Kirk | 248/429 X |
| 4,648,647 | 3/1987 | Cox et al. | |
| 4,652,052 | 3/1987 | Hessler et al. | |
| 4,671,571 | 6/1987 | Gionet | |
| 4,844,542 | 7/1989 | Humer | |
| 4,880,084 | 11/1989 | Tanaka et al. | |
| 4,881,774 | 11/1989 | Bradley et al. | |
| 4,909,570 | 3/1990 | Matsuhashi | |
| 4,951,966 | 8/1990 | Nihei | |
| 5,020,853 | 6/1991 | Babbs | |
| 5,052,751 | 10/1991 | Hayakawa et al. | |
| 5,100,092 | 3/1992 | Sovis | |
| 5,286,076 | 2/1994 | De Voss et al. | 248/429 X |
| 5,390,981 | 2/1995 | Griswold | |
| 5,407,165 | 4/1995 | Balocke | |
| 5,531,503 | 7/1996 | Hughes | |
| 5,547,159 | 8/1996 | Treichi et al. | |
| 5,567,013 | 10/1996 | Chang | |
| 5,597,206 | 1/1997 | Ainsworth et al. | |
| 5,605,377 | 2/1997 | Tame | |
| 5,626,392 | 5/1997 | Bauet et al. | |
| 5,806,825 | 9/1998 | Couasnon | 248/429 |

FOREIGN PATENT DOCUMENTS

| | | | |
|---|---|---|---|
| 345096 | 3/1931 | United Kingdom | 248/429 |
| 360011 | 10/1931 | United Kingdom | 248/429 |

*Primary Examiner*—Peter M. Cuomo
*Assistant Examiner*—David E. Allred
*Attorney, Agent, or Firm*—Banner & Witcoff, Ltd.

[57] ABSTRACT

An easy entry seat track assembly with full memory comprises a lower track assembly and an upper track assembly, releasably slidable on the lower track assembly. A master latch assembly in a latching position releasably secures the upper track assembly to the lower track assembly at an initial position. A rod is affixed to the lower track assembly, preferably on a lower track, and a memory register comprising a wrap spring is positioned around the rod. A memory actuation mechanism moves the memory register from a normal condition to a memory position and disengages the master latch, allowing the upper track assembly to slide over the lower track assembly to a free position. Return of the upper track assembly to the initial position returns the master latch to reengage the lower track assembly, and then returns the memory register to the normal condition. The memory actuation mechanism can comprise a cam lever rotatable from a first position where the memory register is in the normal condition, to an operating position where the memory register is in the memory position and the cam lever urges the master latch into the unlatching position. The memory register stays in the memory position and the master latch stays in the unlatching position until the upper track assembly returns from the free position to the initial position. A latch mechanism such as a latch plate or latchlock lever may be used to hold the cam lever in the operating position while the upper track is in a free position.

51 Claims, 24 Drawing Sheets

EASY ENTRY SEAT TRACK ASSEMBLY WITH FULL MEMORY

FIELD OF THE INVENTION

The present invention relates generally to an improved easy entry seat track assembly having a memory feature which allows a seat to be unlatched and moved from an initial position and then returned to its initial position and automatically re-latched at the initial position.

BACKGROUND OF THE INVENTION

Seat track assemblies are commonly used for forward and rearward comfort adjustment of seats, particularly seats affixed to motor vehicles. Such seats normally have a seat base and a seat back, with the seat back pivotably connected to the seat base by recliners. Upper seat tracks are slidable over lower seat tracks, and the tracks are releasably secured together at a selected position by a master latch assembly. When such seats are positioned, for example, in the front row of a 2-door vehicle, it is desirable to be able to move the seats forward to allow access to a back row of the motor vehicle. Easy entry, as that term is used by those skilled in the art, refers to a seat mounted on a seat track assembly in which the upper seat tracks can be readily unlatched from their corresponding lower tracks and the seat slid forward, allowing greater access to the back row.

Memory, as that term is used by those skilled in the art of seat track assemblies refers to a seat track assembly having a system in which the seat automatically re-latches when returned to a preselected position. Such memory systems are typically either single point memory, where the seat re-latches when returned to one particular position preselected by the manufacturer, or full memory, where the seat re-latches when returned to the same position it was in before the seat was moved by the easy entry feature.

From the vantage point of an operator of the seat, easy entry with full memory is considered more desirable than easy entry with single point memory. However, known full memory designs greatly increase the cost and complexity of such easy entry seat track assemblies. It would be desirable to have a low cost memory feature on an easy entry seat track assembly having fewer components and greater reliability.

In view of the foregoing, it is an object of the present invention to provide a seat track assembly having both easy entry and full memory features with reduced cost and complexity and enhanced manufacturability. It is another, related object of the present invention to provide such an easy entry seat track assembly with full memory that is highly reliable in operation.

SUMMARY

In accordance with these and other objects, there is provided a seat track assembly which comprises a fixed lower track assembly having a lower track, an upper track assembly having an upper track slidable over the lower track, a master latch, movable from a latching position to an unlatching position, releasably securing the upper track at an adjustable initial position with respect to the lower track when in the latching position, a rod affixed to the lower track assembly, a memory register and a memory actuation mechanism. For comfort adjustment the master latch can be disengaged through operation of a "towel bar" or other suitable release mechanism, and the upper track slid forward or rearward with respect to the lower track.

The memory register comprises at least a wrap spring wrapped around the rod, slidable over the rod in the normal condition and wrapped tightly around the rod in the memory position. The memory register is movable over the rod from a normal condition where it is slidably adjustable with respect to the rod and moves with the upper track, to a memory position where the memory register is fixed with respect to the rod, thereby identifying the initial position. The memory actuation mechanism serves to move the memory register between the normal condition and the memory position, and to move the master latch between the latching position and the unlatching position. Preferably the memory register is moved to the memory position first, then the master latch is disengaged, allowing the upper track to slide with respect to the lower track to a free position. Then, once easy entry has been obtained, return of the upper track to the initial position preferably causes the master latch to return first to the latching position and then the memory register returns to the normal position. The memory actuation mechanism comprises a cam lever rotatable from a first position where the memory register is in the normal condition and the master latch is in the latching position, to an operating position where the memory actuation mechanism does not engage the wrap spring, allowing the memory register to move from the normal condition to the memory position, and where the cam lever engages the master latch to move the master latch to the unlatching position, thereby allowing the upper track to slide to the free position. A latch mechanism can be used to hold the cam lever in the operating position while the upper track is in the free position. Multiple preferred embodiments of the latch mechanism are disclosed.

The cam lever can be pivotally connected to a plunger which in an engaging position directly contacts the wrap spring. The plunger moves with the upper track assembly. During comfort adjustment the plunger pushes the memory register. The plunger stays in the engaging position unless easy entry is initiated. Tension on a cable connected between the seat back and the cam lever can pull the cam lever from the first position to the operating position when the seat back is "dumped", that is, pulled forward to a full down position. Rotation of the cam lever pulls the plunger up out of engagement with the wrap spring, to a disengaging position where the plunger moves with the upper track independently of the wrap spring.

From the foregoing disclosure and the following more detailed description of various preferred embodiments, it will be apparent to those skilled in the art that the present invention provides a significant advance in the technology and art of easy entry seat track assemblies with full memory. Particularly significant in this regard is the potential the invention affords for complexity reduction, for enhanced manufacuturability and reliability, and for low cost. Additional features and advantages of various preferred embodiments will be better understood in view of the detailed description provided below.

BRIEF DESCRIPTION OF THE DRAWINGS

FIG. 14 is a perspective view with the upper track and lower track removed for clarity of illustration, showing the memory register in the normal condition.

FIG. 15 is a perspective view of the preferred embodiment of FIG. 14 shown with the memory register in a memory position where the upper seat track has been moved forward.

FIG. 16 is an isolated perspective view of the cam lever.

FIG. 17 is an isolated perspective view of the plunger.

FIG. 18 is an isolated perspective view of a latch plate.

FIG. 19 is an isolated perspective view of the plunger housing.

FIGS. 20–24 show the memory actuation mechanism as it cycles from where the cam lever is in the initial position (FIG. 20); to where rotation of a seat back toward the full down position initiates movement of the cam lever from the initial position (FIG. 21); to where the cam surface of the cam lever initiates contact with the master latch (FIG. 22); to where the plunger disengages the memory register and the master latch is in the unlatching position, but the upper track is still in the initial position (FIG. 23); to where the upper track is slid forward over the lower track and the latch plate has moved from the disengaging position to the engaging position, temporarily preventing the plunger from returning to the engaging position (FIG. 24).

Figure 1:
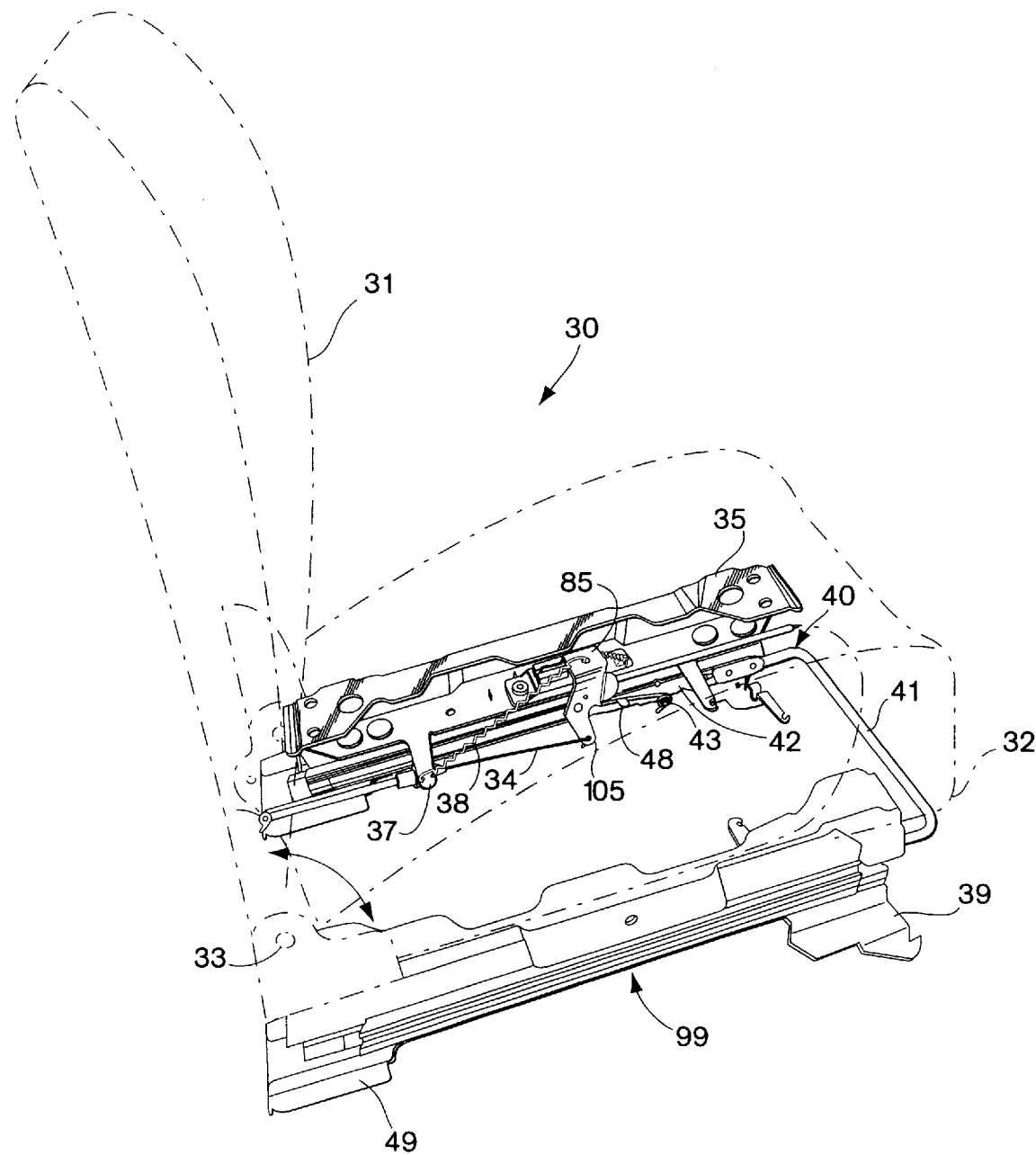
FIG. 1 is a perspective view of a motor vehicle seat having a seat track assembly with full memory in accordance with a preferred embodiment.

It should be understood that the appended drawings are not necessarily to scale, presenting a somewhat simplified representation of various preferred features illustrative of the basic principles of the invention. The specific design features of an easy entry seat track with full memory as disclosed here, including, for example, the degree of motion of the plunger, and the specific dimensions of the cam lever and latch-lock mechanism, will be determined in part by the particular intended application and use environment. Certain features of the illustrated embodiments have been enlarged or distorted relative to others to facilitate visualization and clear understanding. In particular, thin features may be thickened, for clarity of illustration. All references to direction and position, unless otherwise indicated, refer to the orientation of the parking brake control illustrated in the drawings. In general, forward and rearward refers to the axis of the seat tracks, extending in generally right and left directions, respectively, in the plane of the paper in the side view of FIG. 2, and up, down or vertical refers to corresponding generally up and down or vertical directions in the plane of the paper in FIG. 2.

DETAILED DESCRIPTION OF CERTAIN PREFERRED EMBODIMENTS

It will be apparent to those skilled in the art, that is, to those who have knowledge or experience in this area of technology, that many design variations are possible for the easy entry seat track assembly with full memory disclosed herein. The following detailed discussion of various alternative and preferred features and embodiments will illustrate the general principles of the invention with reference to an easy entry seat track with full memory used in a motor vehicle seat, particularly in a two-door vehicle, although the principles of the invention will be applicable to seats used elsewhere.

Referring now to the drawings, FIGS. 1–13 show a first preferred embodiment of the easy entry seat track assembly with full memory. FIG. 1 shows a motor vehicle seat 30 having a seat back 31 pivotably connected by recliners 33 to a seat base 32. A seat back latch, not shown, allows the seat back to be moved from a full up position to a full down position. A cable 34 connects the seat back to each seat track assembly 99. Front and rear lower risers 39,49 are mounted on each lower track 55. The seat base is mounted on upper risers 35, which in turn are mounted on upper tracks 50. The risers raise and establish the angle of the seat base.

Figure 2:
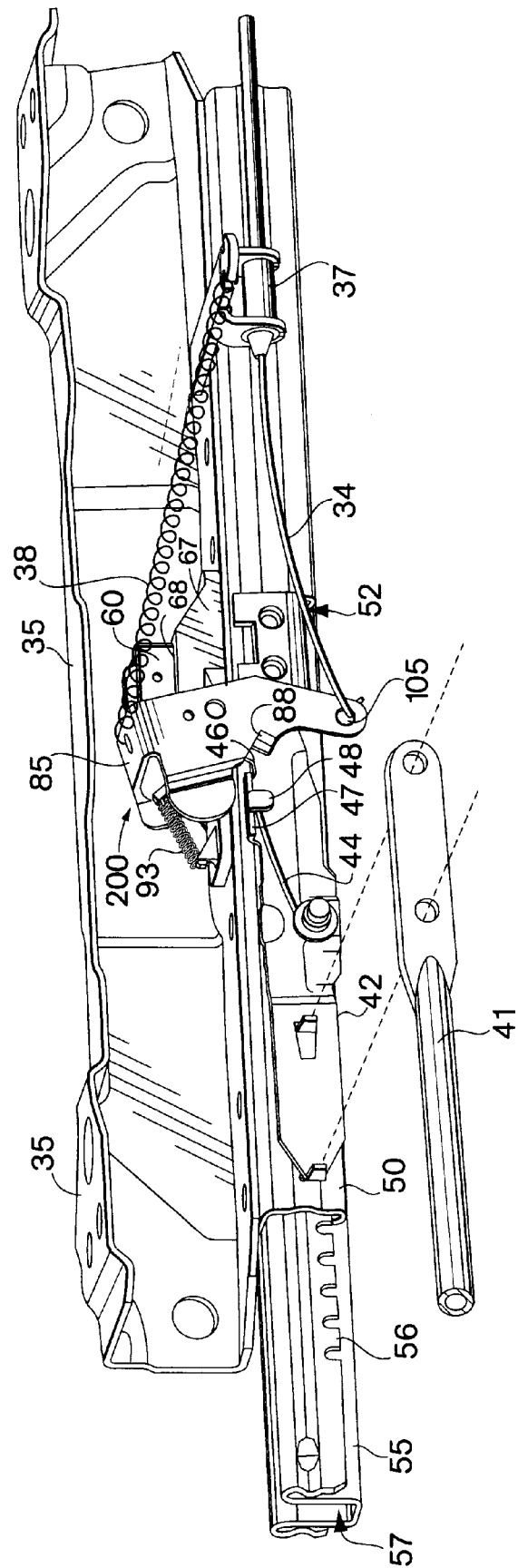
FIG. 2 is partially exploded perspective view of the seat track assembly in accordance with a preferred embodiment.
Figure 8:
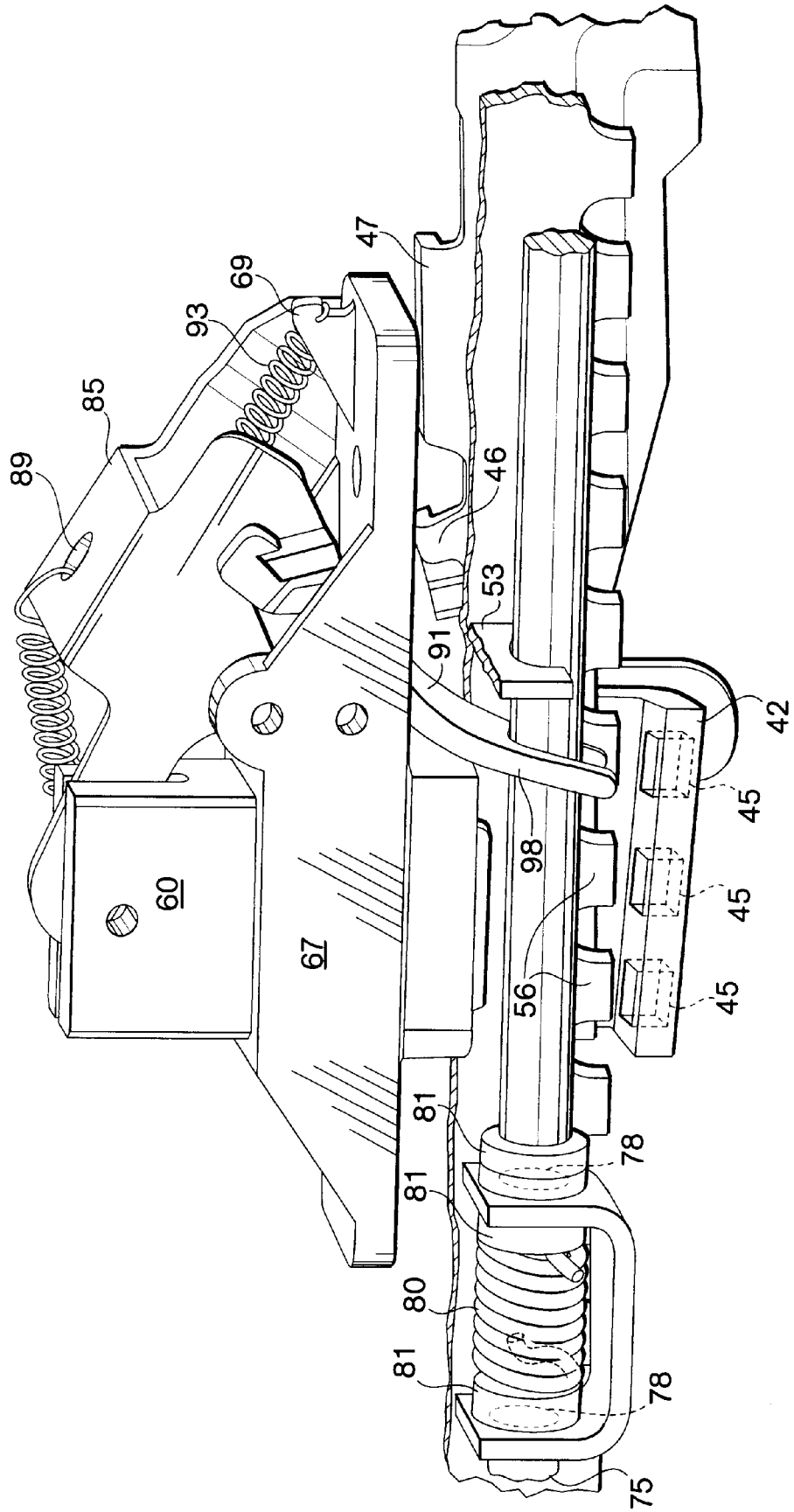
FIG. 8 is a perspective view with the seat tracks and risers removed for clarity of illustration, shown with the plunger in a disengaging position and the memory register in a memory position, with the hook engaging the hook tab of the cam lever to restrict return of the cam lever to the first position.

Each seat track assembly 99 is shown to comprise an upper track 50 slidable over a lower track 55. As shown in FIG. 1, preferably a pair of upper tracks are positioned over a pair of lower tracks spaced apart and aligned generally parallel with one another. A master latch 40 releasably secures each upper track to its corresponding lower track. The master latch is movable from a latching position to an unlatching position and has a latch lever 42 pivotably mounted onto the upper track 50 at pivot pin 43. FIG. 2 shows a spring 44 such as a spiral spring mounted around the pivot pin 43, contacting an underside of latch tab 47 and captivated by spring tab 48. The spring biases the latch lever toward the latching position. In the embodiment shown in the drawings, the latch levers 42 have latch windows 45 which engage latch teeth 56 (through an opening 52 in the upper track 50) on a downwardly extending flange of the lower track 55. As best shown in FIG. 8, preferably the portion of the latch lever having the latch windows may be angled so that each latch tooth is received by a corresponding latch window substantially simultaneously. Operation of a towel bar 41 connected to latch lever 42 moves the master latch from the latching position to the unlatching position, allowing the upper tracks to slide with respect to the lower tracks. To facilitate normal comfort adjustment, the towel bar 41 connects the latch levers together so that release of each upper track from each corresponding lower track occurs substantially simultaneously.

Preferably a memory register 76 and memory actuation mechanism 200 will be positioned on each pair of seat tracks, to minimize torsional bending on the seat track assembly and to help ensure that the latch levers 42 are aligned with the latch teeth for proper latching and unlatching. As the memory system on pairs of seat tracks will be substantially mirror images of one another, only one will be shown in FIG. 2–13 for purposes of illustration and explanation of how the memory actuation mechanism interacts with the memory register of the first preferred embodiment.

Figure 7:
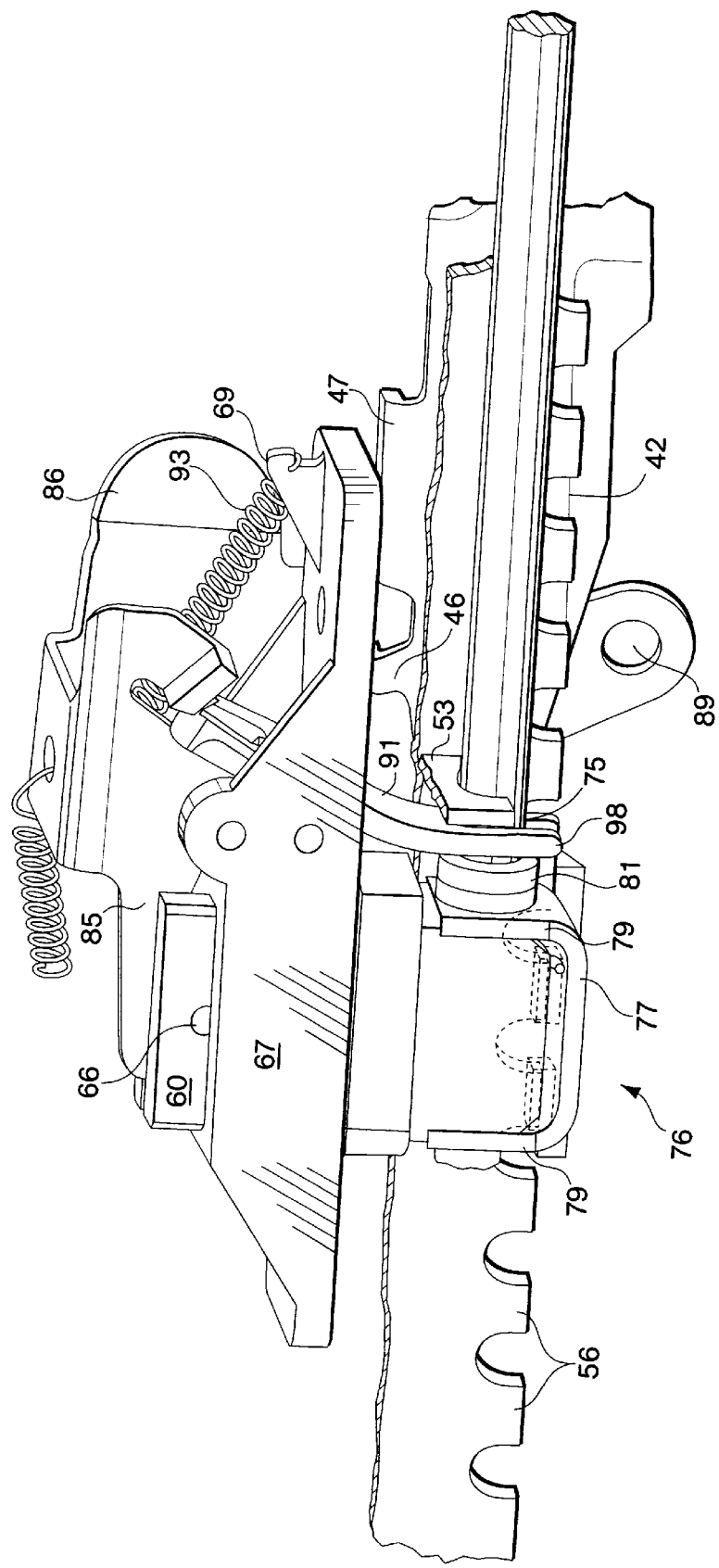
FIG. 7 is a perspective view with the seat tracks and risers removed for clarity of illustration, shown with the plunger in a normal engaging position.

A rod 75, shown best in FIGS. 7 and 8, is attached to the lower track, and to minimize space requirements of the memory system the rod is preferably positioned in a central channel 57 between the upper and lower tracks. The memory register 76 is slidable over the rod in the normal condition and is seen to comprise a U-shaped bracket 77 having a pair of openings 78 positioned in first and second ends 79 and sized to slidably receive the rod 75. A wrap spring 80 is wrapped around the rod. Preferably elastomeric bumpers 81 may be positioned between the wrap spring and the first and second ends 79 of the bracket 77. The wrap spring 80 has first and second ends 82 which receive the memory actuation mechanism 200 when the memory register 76 is in the normal condition, partially unwinding the wrap spring 80 from the rod 75. As described in more detail below, this advantageously allows the memory register 76 to travel with the upper track 50 when the master latch 40 is in the unlatching position. When the memory actuation mechanism 200 disengages the wrap spring ends 82, the wrap spring winds tightly against the rod and prevents motion of the memory register, thereby setting the memory register to a memory condition in which the upper track can move with respect to the lower track, but the memory register cannot move with respect to the lower track.

Figure 3:
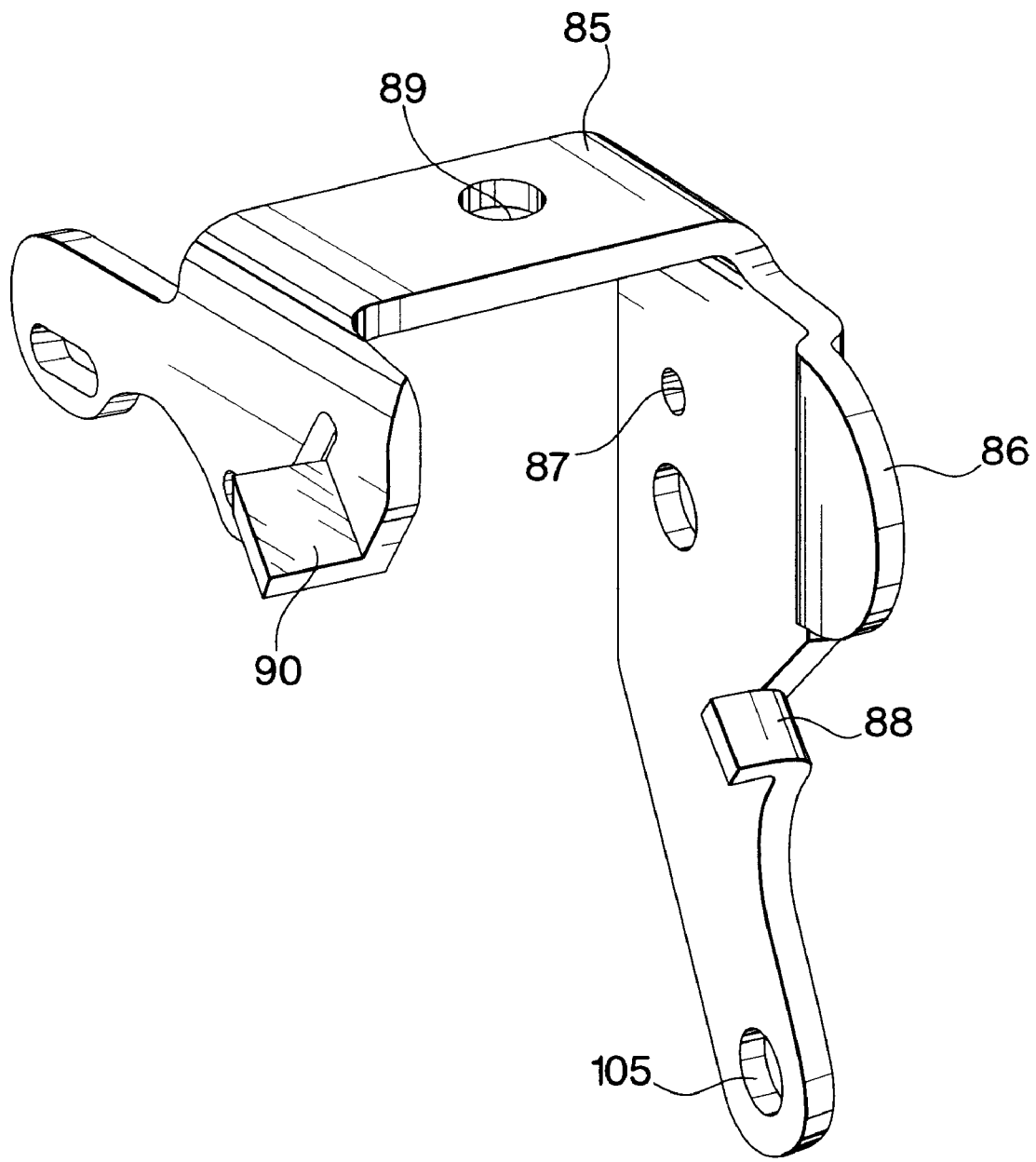
FIG. 3 is an isolated perspective view of the cam lever of FIG. 2.
Figure 4:
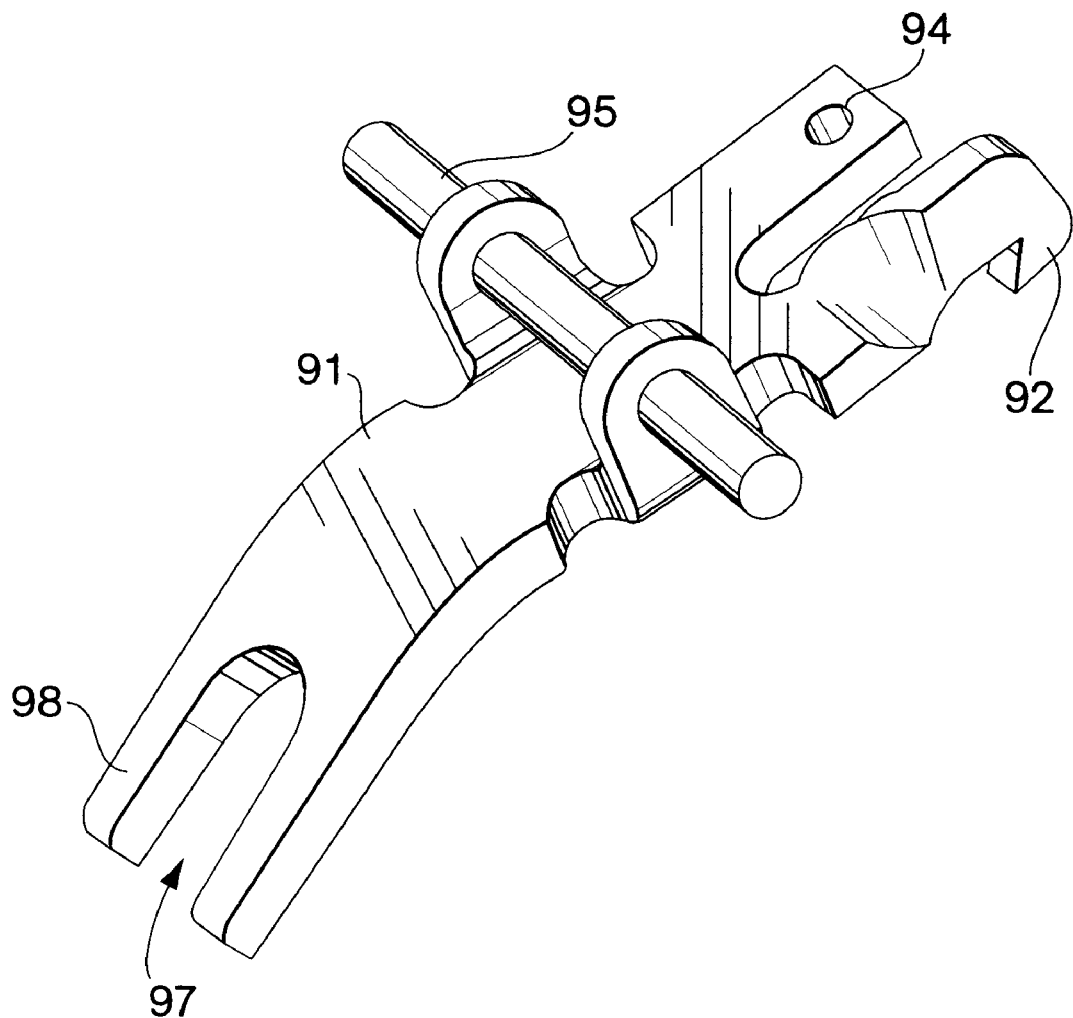
FIG. 4 is an isolated perspective view of the latch-lock lever of FIG. 2.

The memory actuation mechanism shown in the drawings is seen to comprise a cam lever 85 pivotably attached to a housing 67 and pivotably attached to a plunger 60. In FIG. 3, the cam lever 85 is shown in isolated perspective view and is seen to have a cam surface 86, cam lever pivot opening 87, latch-lock tab 88, cable attachment point 89 and hook tab 90. The cam lever 85 is pivotable on the housing 67 from a first position where the wrap spring 80 is slidably adjustable with respect to the rod 75 and the master latch 40 is in the latching position, to an operating position where the cam lever cam surface 86 contacts the latch tab 47 to urge the master latch 40 to the unlatching position. The cam lever pivots from the initial position in response to tension on the cable 34, attached at cable attachment point 105 when the seat back is pivoted toward the full down position. Note that during normal comfort adjustment, the cam lever is unaffected and remains in the first position.

Figure 5A:
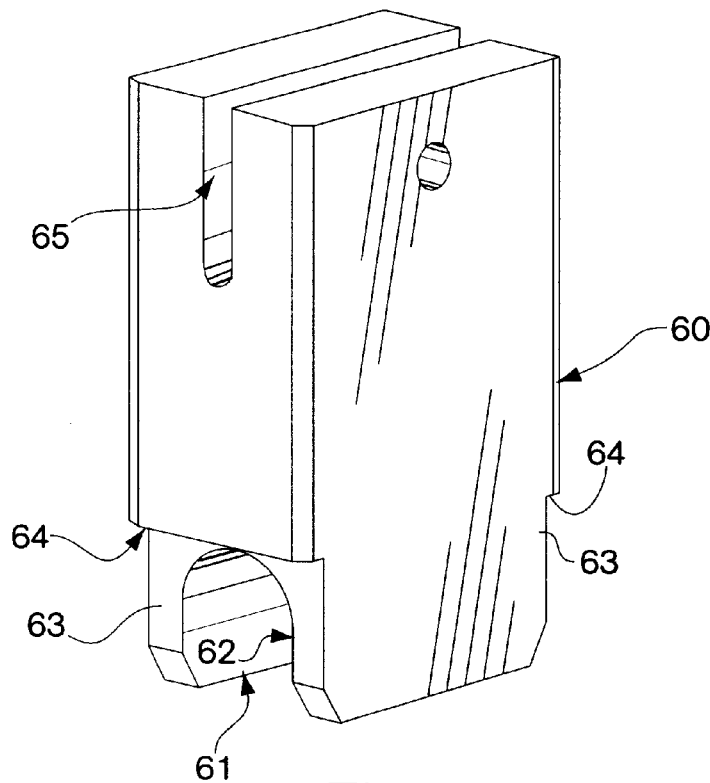
FIG. 5A is an isolated perspective view of the plunger of FIG. 2.
Figure 5B:
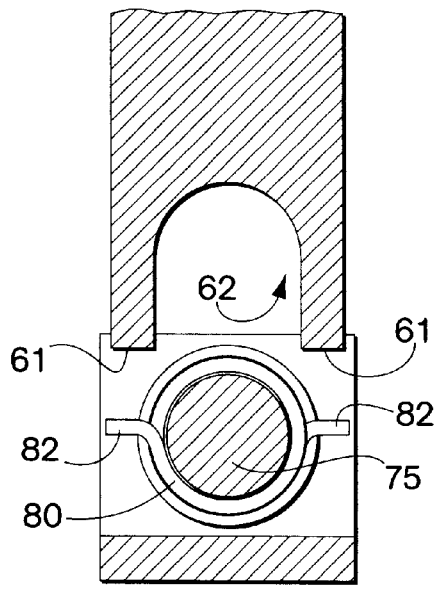
FIG. 5B shows the plunger when it does not engage the wrap spring.
Figure 5C:
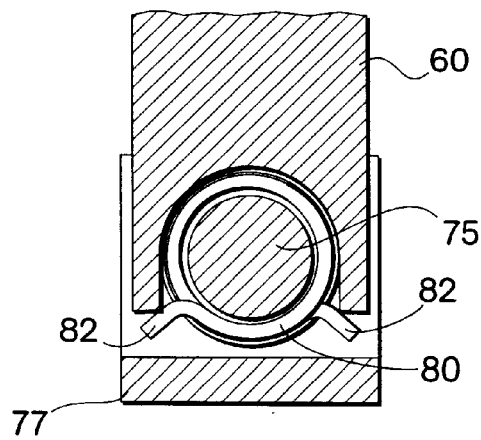
FIG. 5C shows the plunger when it engages the wrap spring.
Figure 6:
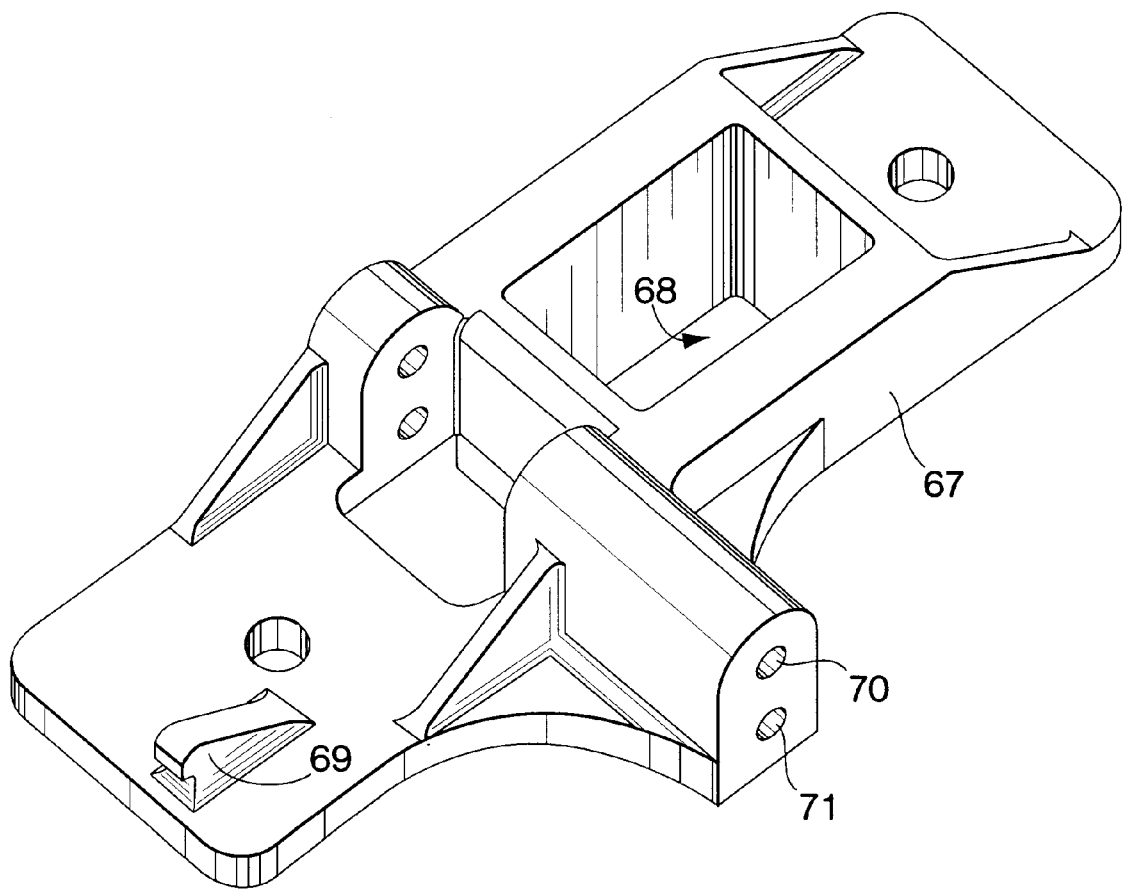
FIG. 6 is an isolated perspective view of the plunger housing of FIG. 2.

The plunger 60 is linearly slidable from an engaging position to a disengaging position in a passage defined by an opening 51 in the upper track and an opening 68 in the housing 67 attached to the upper riser 35. As shown in FIG. 5A, the plunger 60 has a slot 65 to receive the cam lever 85, and the cam lever and plunger are connected by pivot pin 66. To allow access to the memory register, the plunger is positioned in a passage defined by an opening 68 in the housing 67 positioned directly over an opening 36 in the upper riser, which is positioned directly over an opening 51 in the upper track 50. The plunger has downwardly facing contact faces 61 which are positioned on either side of the rod 75 when the plunger is in the engaging position (FIG. 5C). The contact faces engage first and second ends 82 of the wrap spring, forcing the wrap spring to partially unwind around the rod so that the spring is slidable over the rod. The plunger has front and rear faces 63 which engage first and second ends 79 of the bracket 77 to move the memory register in forward and rearward directions when the memory register 76 is in the normal condition. That is, during comfort adjustment of the seat in a forward direction, the plunger is in the engaging position (FIG. 5C) and one of the contact faces 63 of the plunger engages the first end 79 of the bracket, urging the bracket in the forward direction as well. The other contact face 63 will engage the second end 79 of the bracket to urge the bracket along the rod during comfort adjustment in a rearward direction.

Shoulders 64 of the plunger 60 contact the first and second ends 79 of the U-shaped bracket 77 when the plunger is in the engaging position, advantageously limiting further travel of the plunger, and reducing the potential for excessive wear or damage of the plunger wrap spring contact faces 61 or the wrap spring 80. In FIGS. 1–13 the plunger is linearly slidable in a direction perpendicular to the longitudinal axis of the rod and the wrap spring in a passage defined by an opening 68 in the housing 67 positioned over an opening 51 in the upper track 50.

The cam lever 85 and the plunger 60 cooperate to engage and disengage the memory register so that the seat "remembers" the initial position of the upper track after easy entry disengagement of the master latch. Other suitable memory actuation mechanisms will be apparent to those skilled in the art given the benefit of this disclosure.

A latch mechanism such as latch-lock lever 91 is used to hold the cam lever in the operating condition until the upper track returns to the initial position. As shown in the isolated perspective view of FIG. 4, latch-lock lever 91 is pivotable about latch-lock lever pivot 95, has a hook 92 on one end and a distal end 98 on the opposite side of the pivot 95 having a U-shaped opening 97. A hook spring anchor 94 receives one end of a hook spring 93. The other end of the hook spring is anchored to the housing 67 at hook spring anchor 69 shown in FIG. 6.

FIG. 7 shows the latch-lock lever 91 in the normal position. The hook spring 93 urges the distal end 98 of the latch-lock lever toward the memory register. In FIG. 7, the latch-lock lever contacts an elastomeric bumper 81 positioned against the U-shaped bracket 77 to reduce rattling and other noises associated with moving parts. The latch-lock lever 91 optionally can be sandwiched between the bumper and a stop flange 53 extending from the upper track. FIG. 8 shows the latch-lock lever in a second position where the upper track has slid to a free position. This allows the hook spring 93 to pull the hook 92 so that it releasably engages a hook engagement tab 90 on the cam lever 85. In FIG. 8 the cam lever has rotated to the operating position, and the hook 92 captures the hook engagement tab 90 to temporarily prevent return of the cam lever from the operating position. The distal end is no longer in contact with the bumper 81.

Return of the upper track from the free position to the initial position forces the distal end 98 of the latch-lock lever 91 into engagement with the bumper, causing the latch-lock lever to pivot until the hook 92 disengages the hook engagement tab 90. This allows the cam lever to be biased by the cam lever return spring 38 to the first position, which in turn forces the plunger from a disengaging position to the engaging position where it reengages the wrap spring 80, allowing the memory register to slide over the rod 75.

In a highly advantageous feature, the master latch reengages the lower track before the memory actuation mechanism 200 causes the memory register to return to its normal condition. This is preferred to ensure that the latch windows are properly aligned with the latch teeth, thereby minimizing wear in the latch window-latch teeth interface and providing for a positive return of the master latch to the latching position. To ensure that the master latch returns to the latching position before the plunger reengages the memory register, lock-out tabs 46 and 88 are used. When the upper track 50 returns to the initial position from the free position, the latch-lock lever 91 reengages the memory register and the latch-lock lever hook disengages the hook engagement tab 90. When this occurs, the cam lever begins to rotate back toward the first position. However, the lock-out tabs, one 88 on the cam lever and one 46 on the latch lever 42 are precisely positioned so that they will engage one another to prevent the reengagement of the memory register by the plunger and prevent return of the memory register to the normal condition (FIG. 13) as the cam lever is temporarily prevented from returning to the first position. This condition is maintained until the master latch has returned to the latching position. That is, only when the latch windows have reengaged the latch teeth will the latch lever lock-out tab 46 rotate out of the way of the cam lock-out tab 88 and allow the cam lever to return to the first position.

Figure 9:
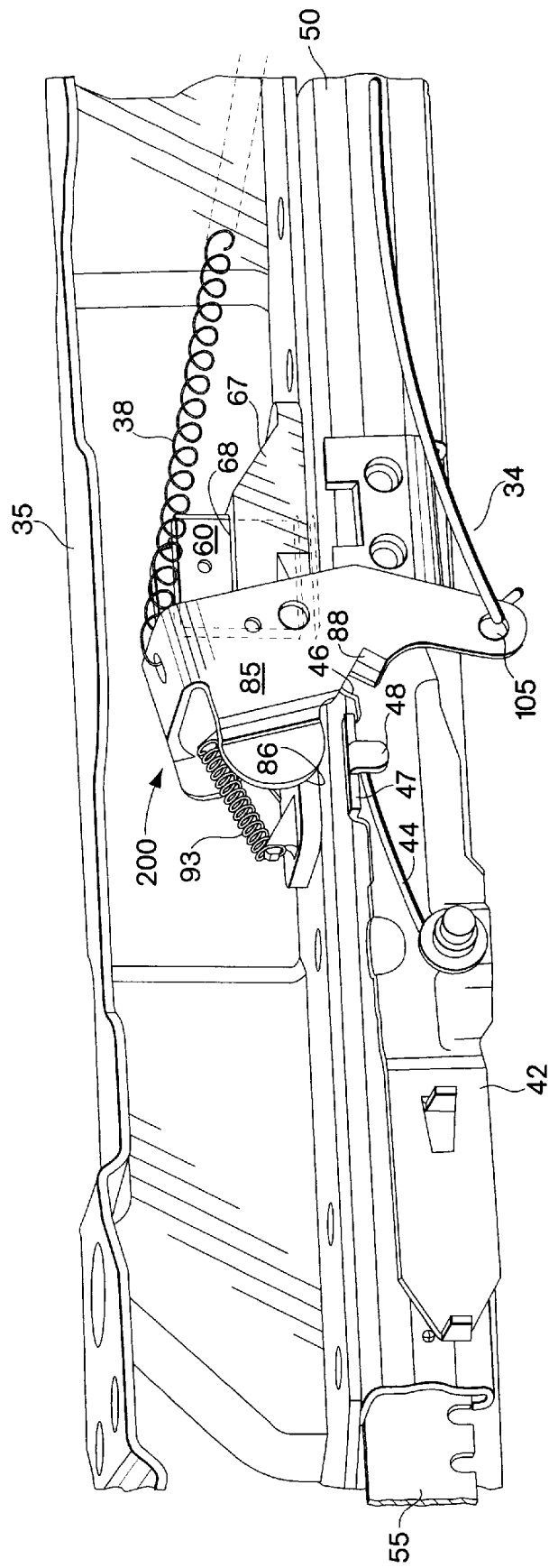
FIGS. 9–11 show the seat track assembly of FIG. 2 as the cable begins to pull the cam lever from the first position to the operating position (FIG. 9), as continued rotation of the cam lever forces the cam surface against the cam tab of the lever (FIG. 10), and as the latch lever is urged to the unlatching position (FIG. 11).
Figure 10:
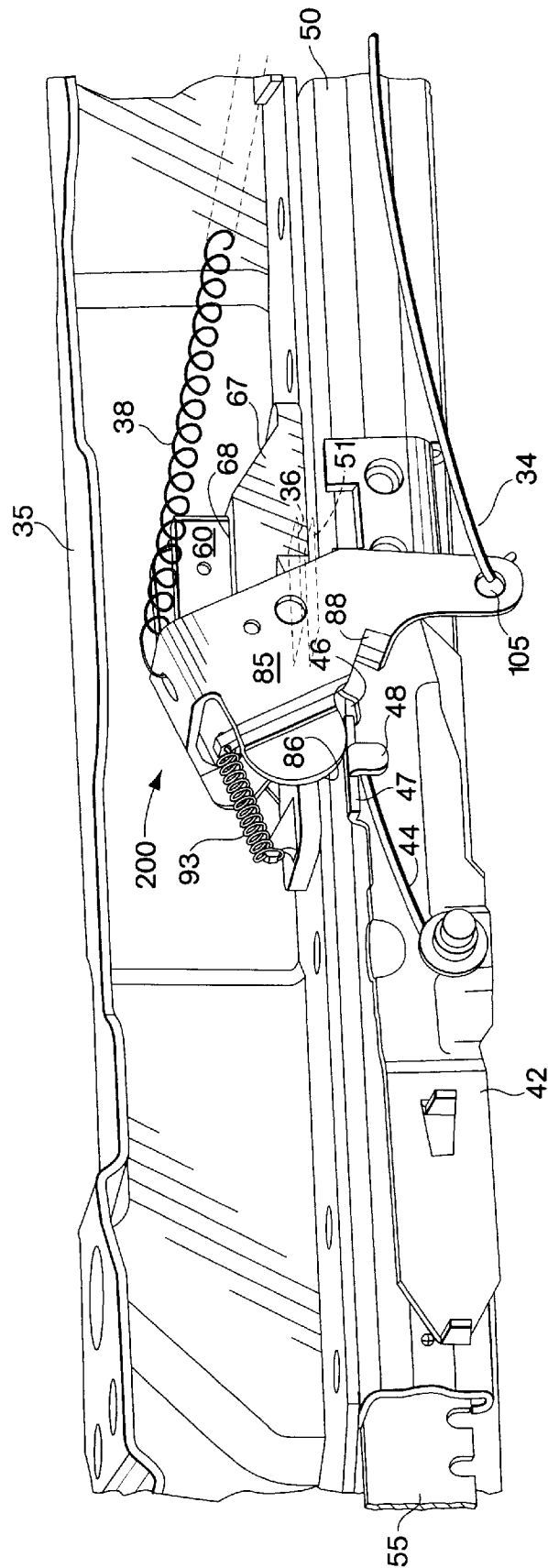
Figure 11:
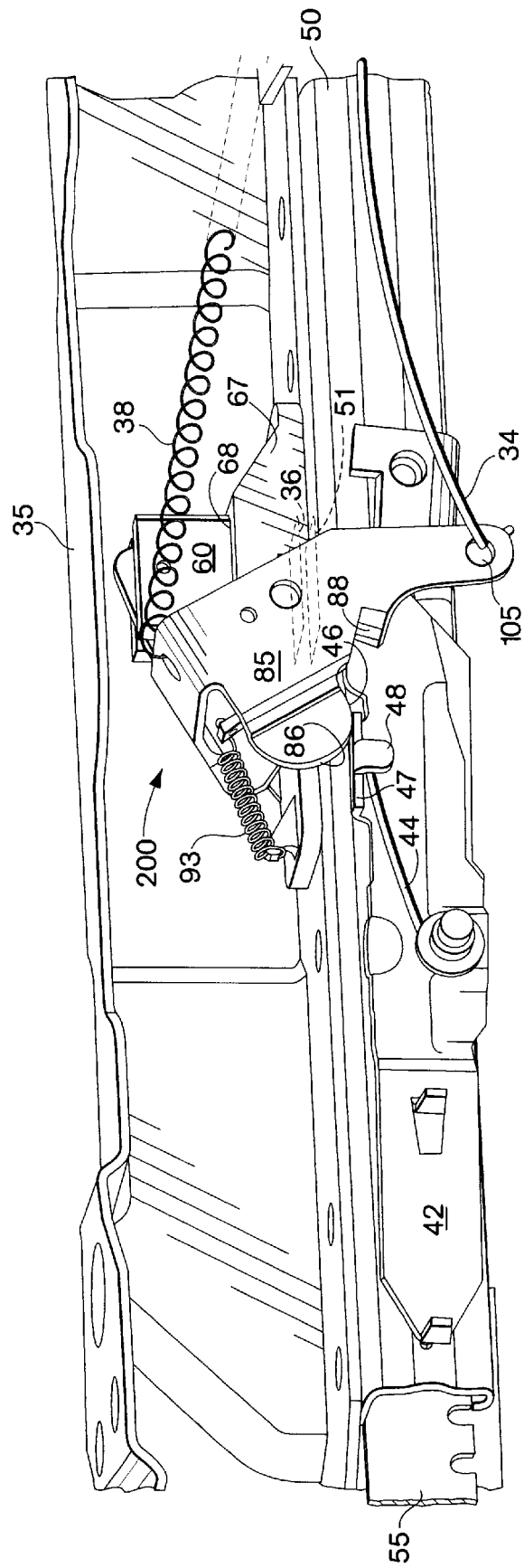
Figure 12:
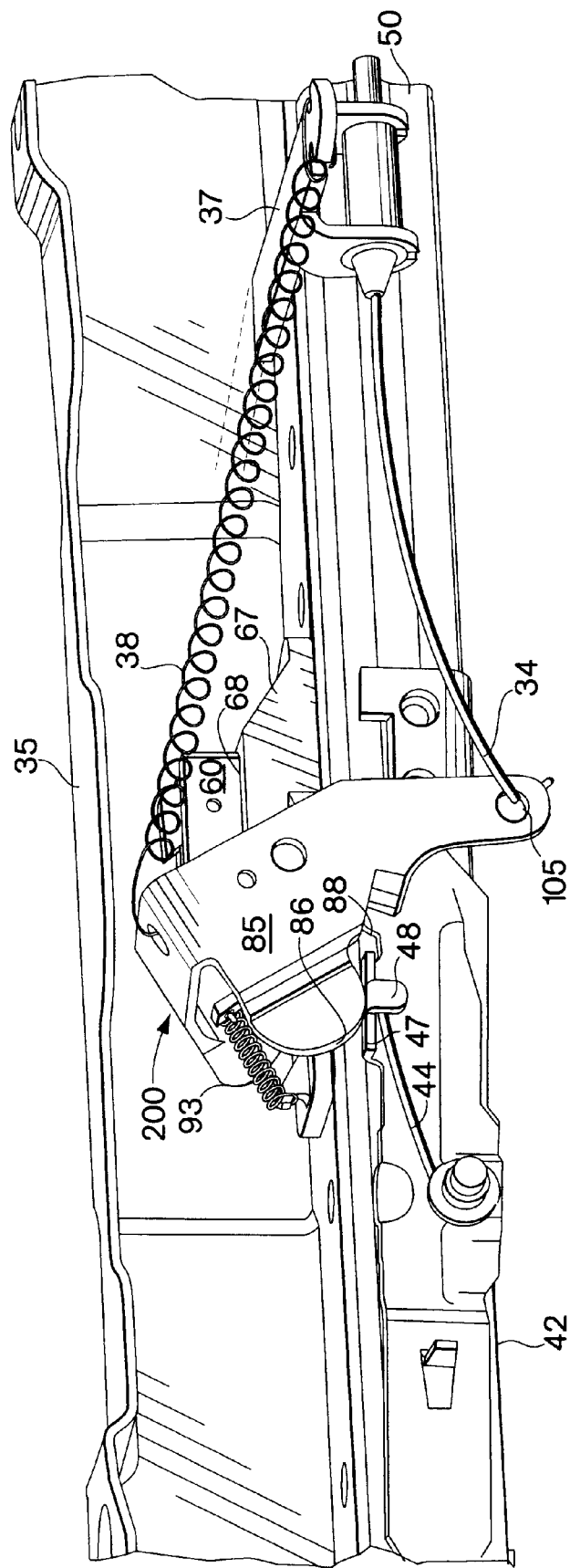
FIG. 12 shows the upper seat track slid to a free position.
Figure 13:
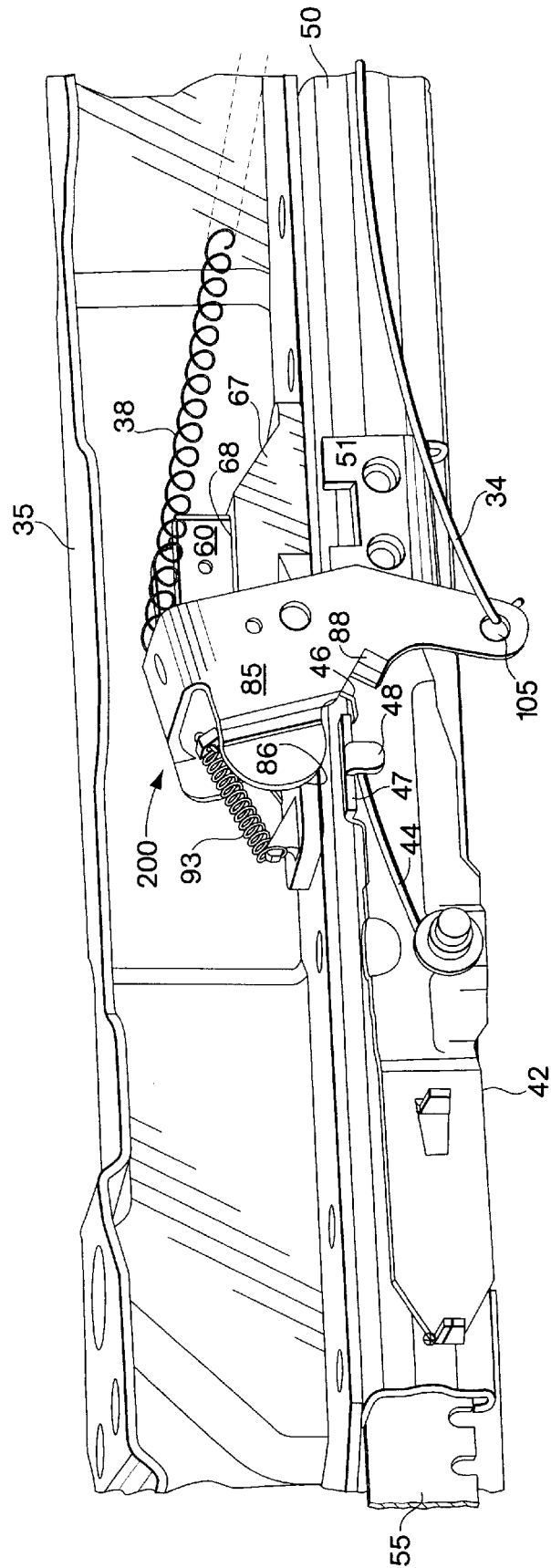
FIG. 13 shows the seat track assembly of FIG. 2 where the lock-out tabs are preventing return of the plunger to the engaging position until the latch lever returns to the latching position.

FIGS. 9–12 shows an example of how the seat track assembly cycles in response to "dumping" of the seat back, that is, moving the seat back to the full down position. In FIG. 9, the cam lever has been moved a small amount from its first position; the master latch is still in the latching position, and the plunger is moving away from the engaging position but has not yet completely disengaged from the wrap spring. The memory register 76 is still in the normal condition. In FIG. 10, continued rotation of the cam lever causes cam surface 86 of the cam lever to contact the latch tab 47. At this point the memory register is in the memory condition, that is, plunger 60 has disengaged from the wrap spring 80. The master latch is still in the latching position. In FIG. 11, the cam surface has urged the master latch to the unlatching position. At this point the memory register is in the memory condition, but the latch-lock lever 91 is still in the normal position, as the upper seat track 50 is still in the initial position. In FIG. 12 the upper track has been slid to a free position, typically a position forward of the initial position of the upper track. (See also FIG. 8 showing the memory actuation mechanism and the memory register when the upper track is in the free position.) The latch-lock lever 91 has pivoted to the second position where the hook 92 engages the hook tab 90 of the cam lever to temporarily prevent return of the cam lever from the operating position to the normal position. This position is maintained until the upper track returns to the memory position, where, as discussed above, the master latch returns to the latching position and then the memory register returns to the normal condition.

FIGS. 14–24 show an alternative preferred embodiment of the easy entry seat track assembly with full memory. Where elements of the two embodiments are substantially similar or identical, such as the memory register, and the upper and lower tracks, the same part numbers are used as those in describing the first preferred embodiment. As with the previous embodiment, only one memory register and memory actuation mechanism are shown, as in designs where a memory register is used on both left and right pairs of seat tracks, the memory register and memory actuation mechanisms typically will be substantially similar.

Figure 14:
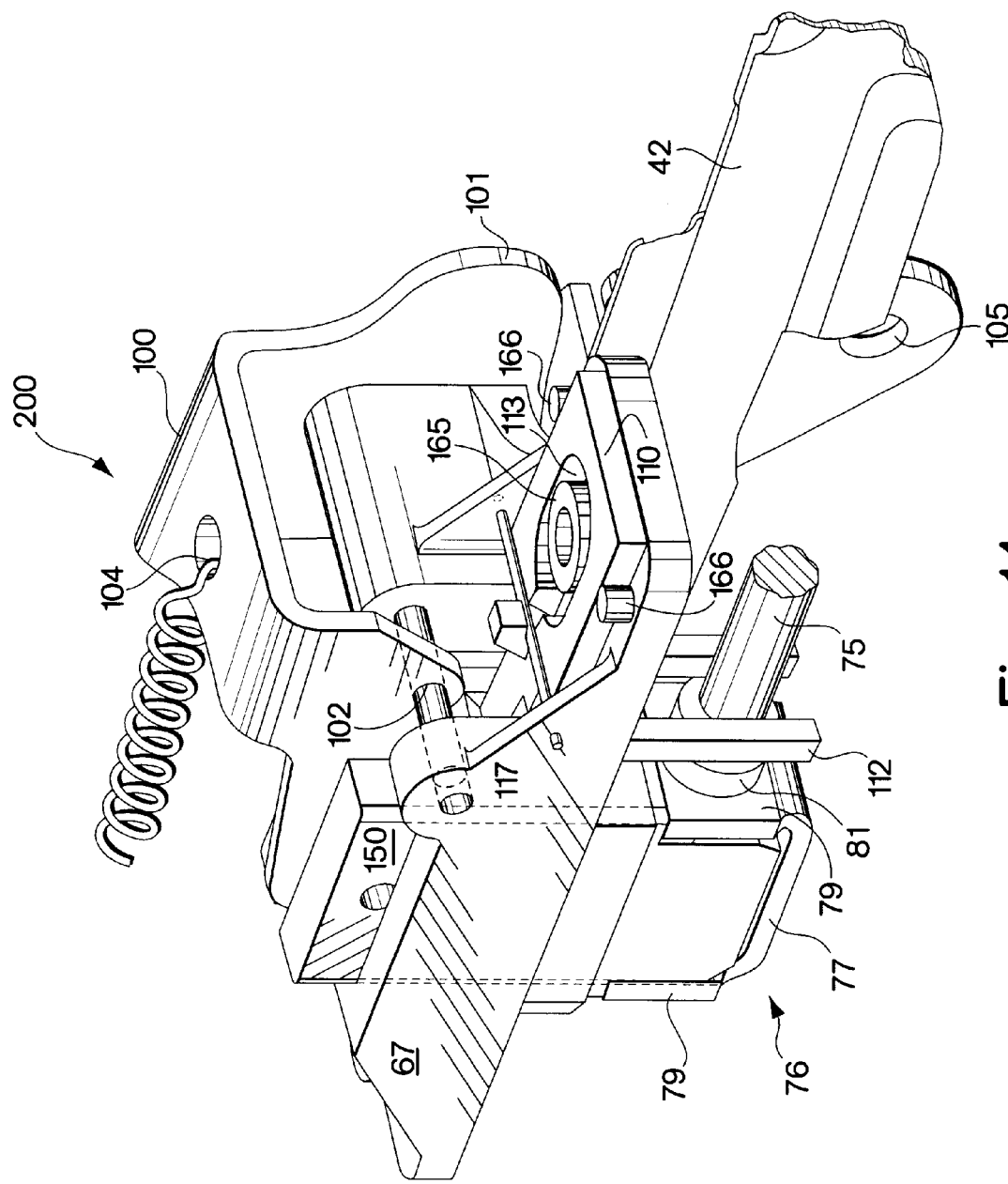
FIGS. 14–24 show an alternative preferred embodiment.
Figure 15:
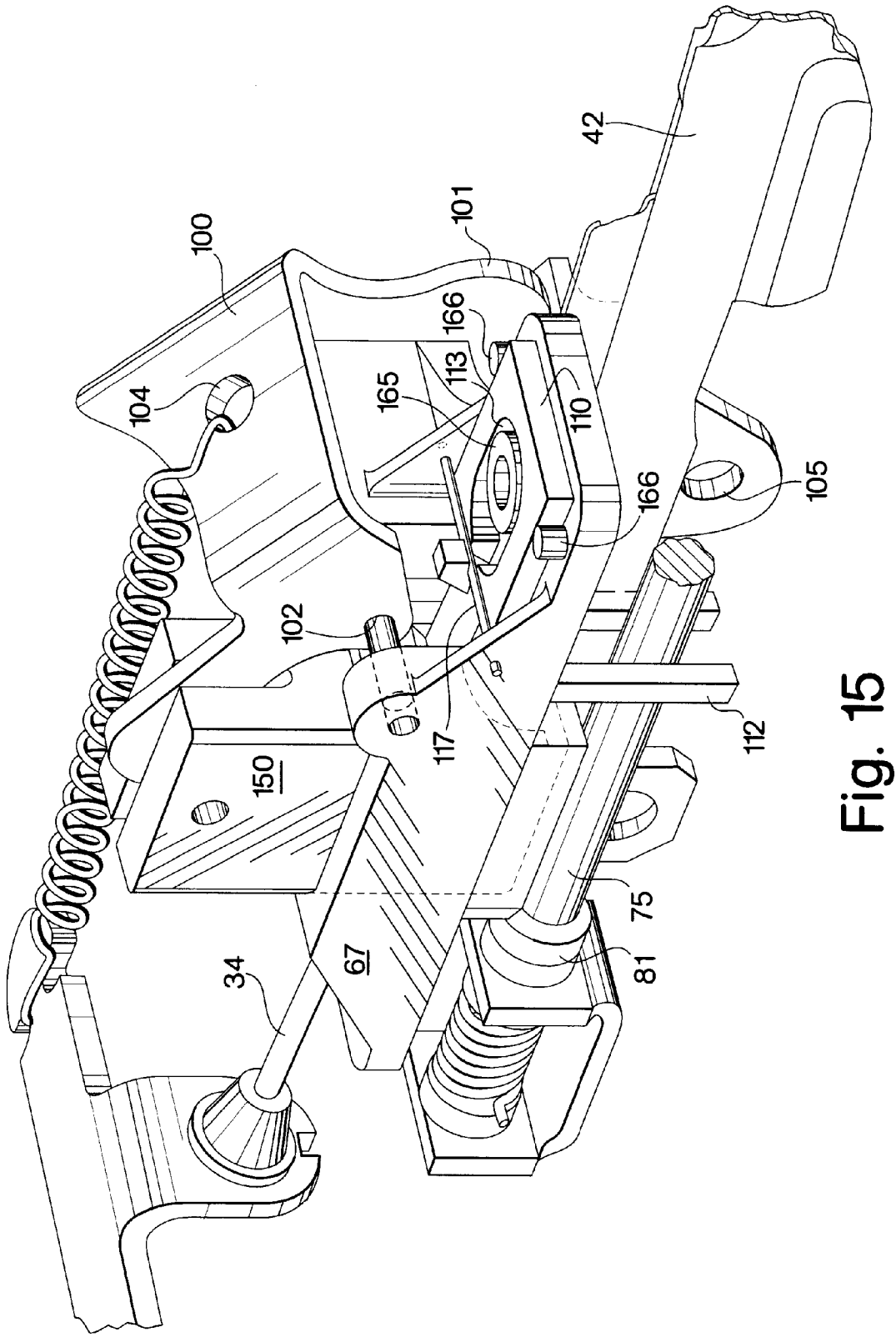

FIG. 14 shows the seat track assembly 99 with easy entry and fill memory where the upper track 50 and lower track 55 have been removed for clarity of illustration, showing the cam lever 100 in a first position and a latch plate 110 in a disengaging position. FIG. 15 shows the seat track assembly 99 where the cam lever 100 has been pulled by cable 34 to an operating position and the latch plate 110 is shown in the engaging position. The latch plate is described in greater detail below.

Figure 16:
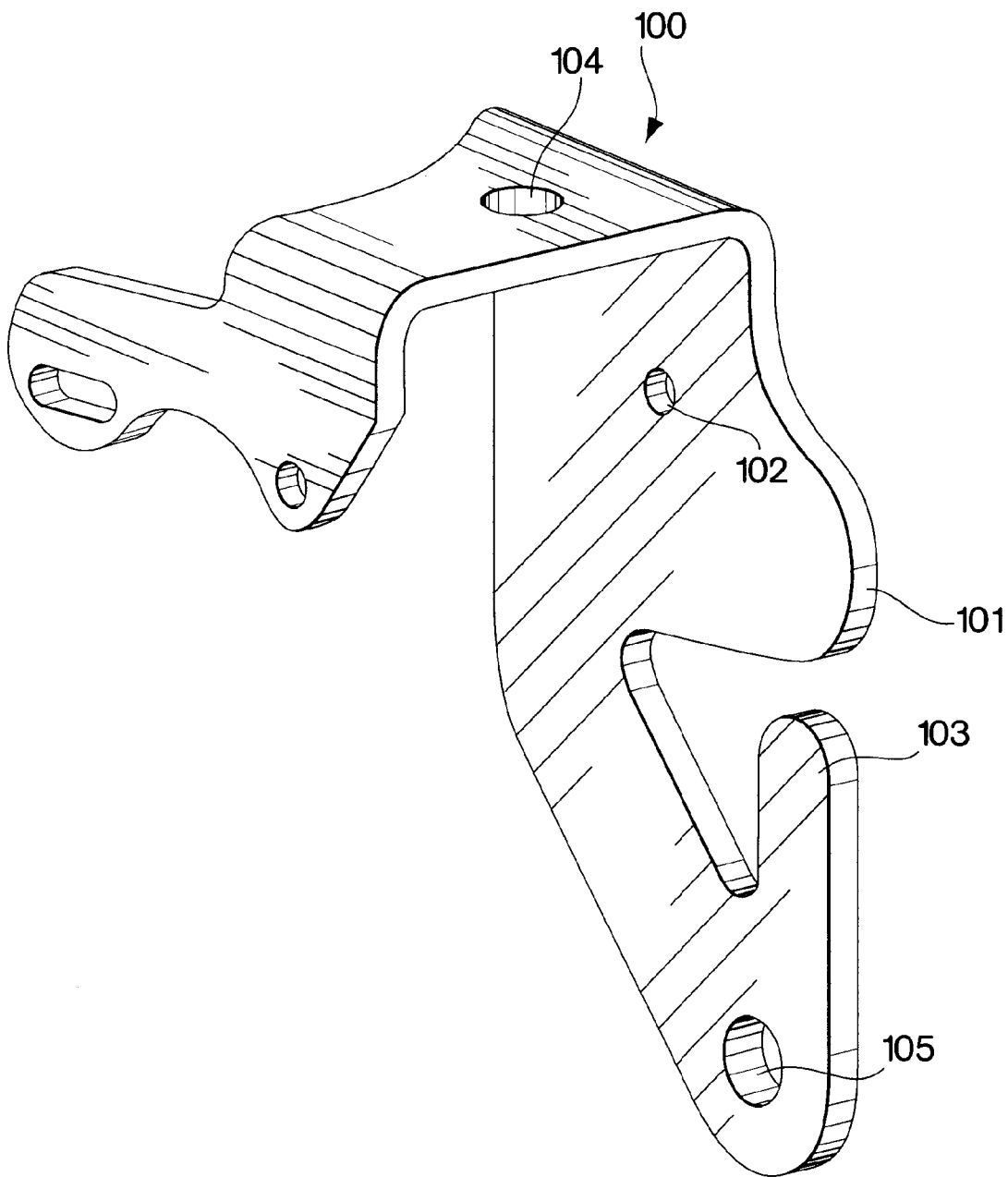
Figure 17:
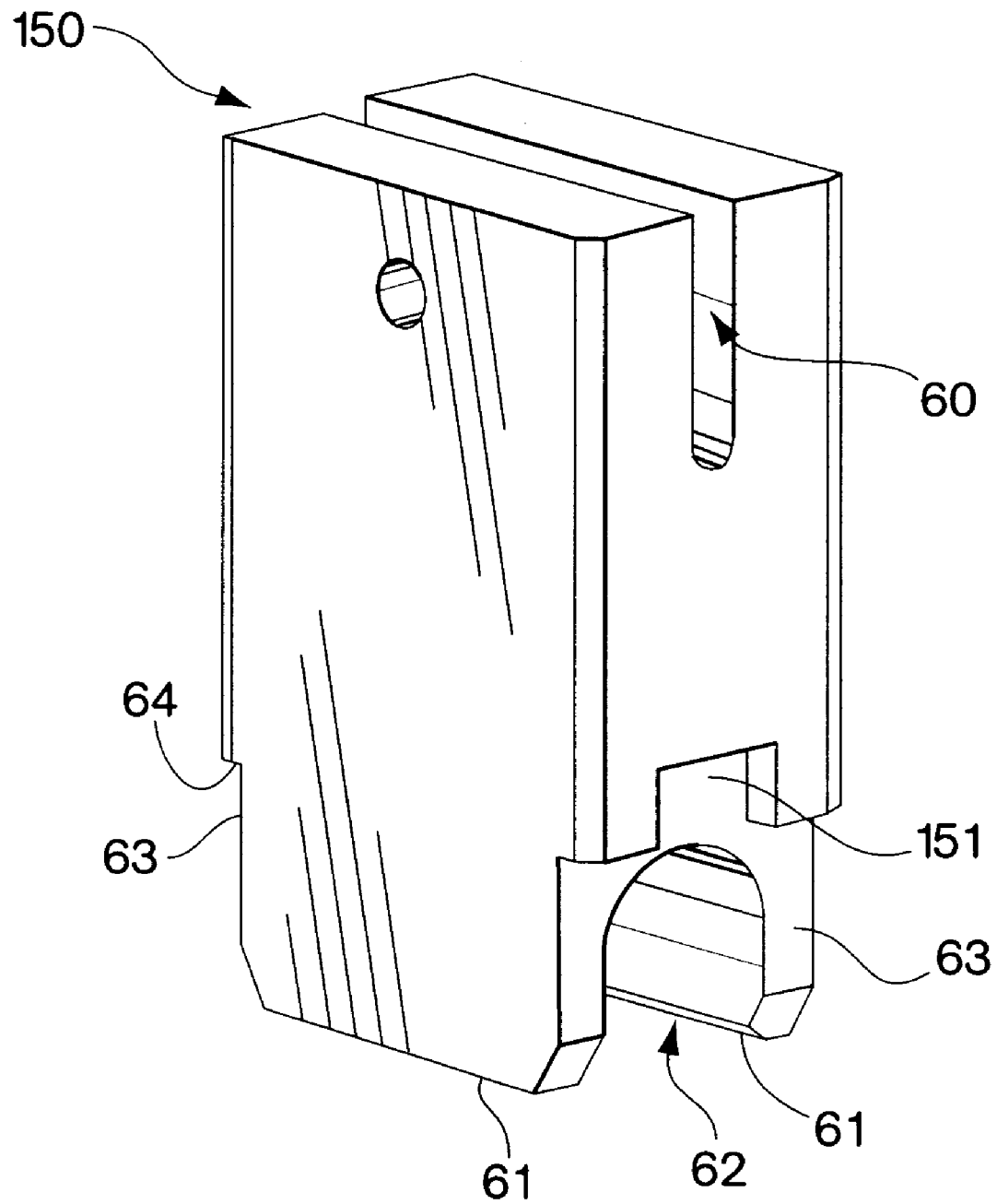
Figure 18:
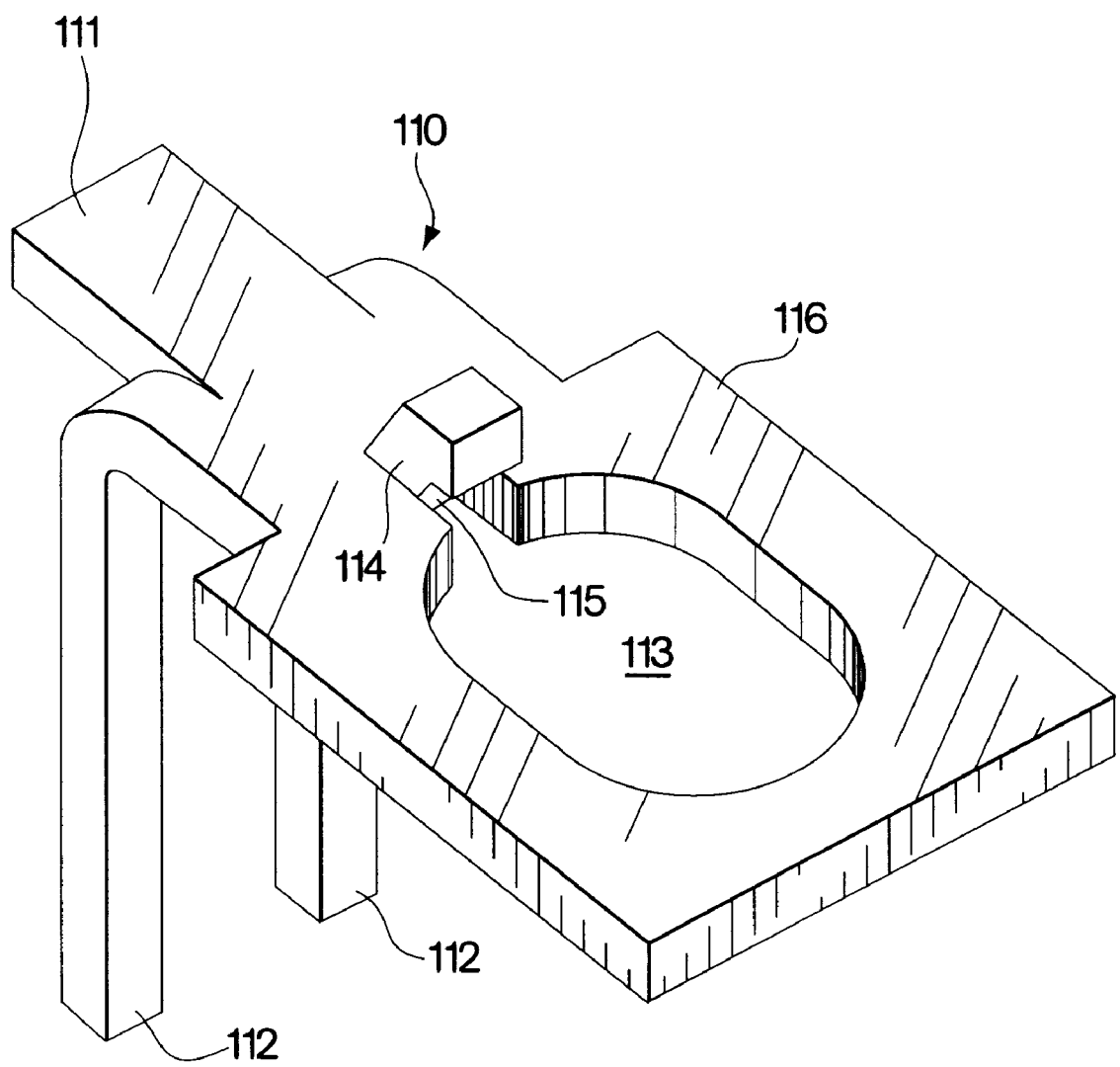

Cam lever 100, as best seen in FIG. 16, has been modified somewhat, and now has cam lock-tab 103 extending as a flange generally co-planar with the cam surface 101. Cam lever 100 has cam lever pivot opening 102. A cable 34 is attached at cable anchor point 105, and pulls the cam lever from the first position to the operating position against the bias force of spring 38 attached to cam lever 100 at cable attachment point 104. The cam lever engages a plunger 150 in much the same way as the previous embodiment, pulling the plunger from an engaging position to a disengaging position as the cam lever rotates from the first position to the operating position. As seen in FIG. 17, the plunger 150 has a plunger pocket 151, but is otherwise substantially identical to the plunger in the first embodiment. FIG. 18 shows an isolated perspective view of an alternative latch mechanism with latch plate 110 holding the plunger out of engagement with the wrap spring 80 when the memory register is in the memory position. The latch plate 110 serves the same function as the latch-lock lever in the previous preferred embodiment, namely to hold the plunger in the disengaging position. The latch plate 110 is movable from a disengaging position where the latch plate does not engage the plunger to an engaging position where a plunger lock member 111 of latch plate 110 extends into the plunger pocket 151, holding the plunger up away from the memory register 76.

Figure 19:
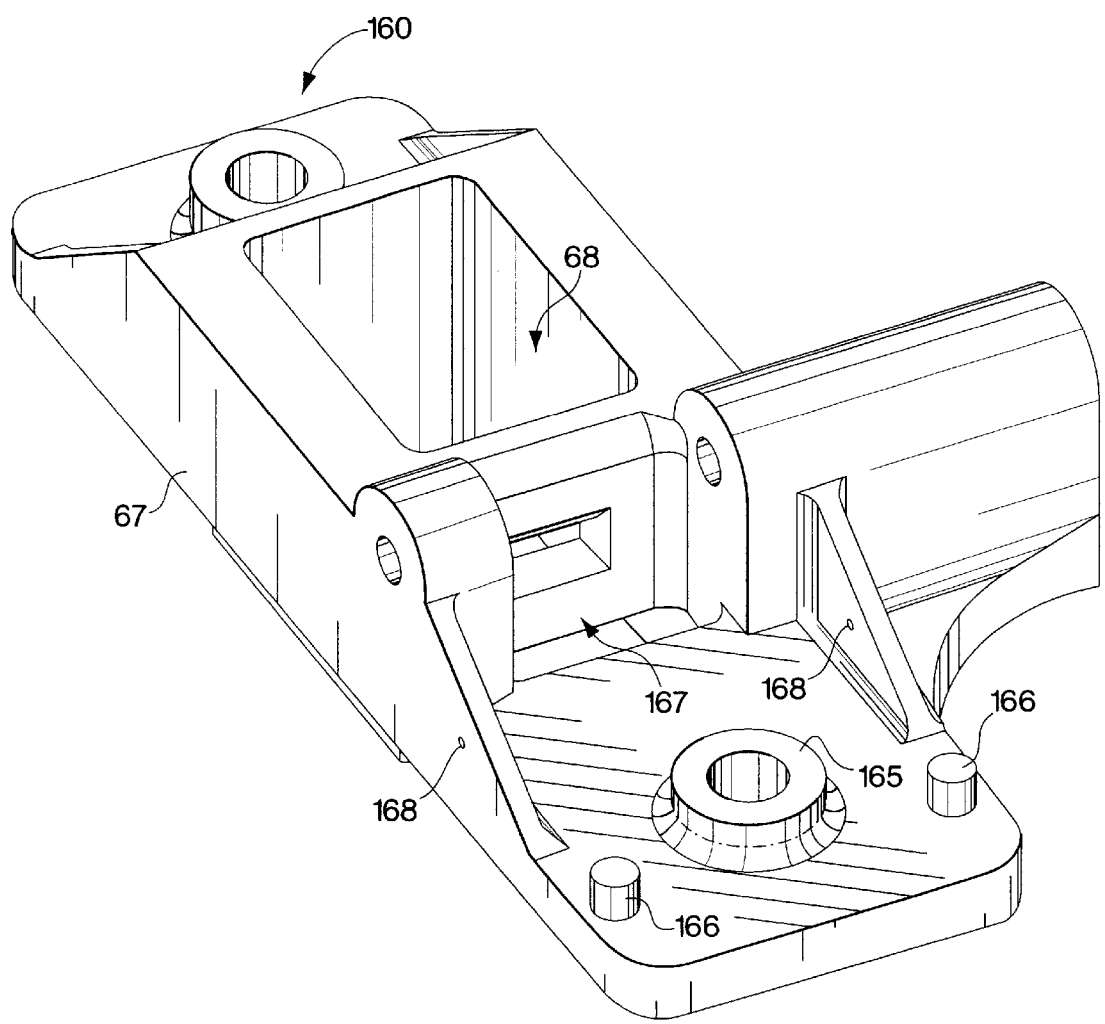

The latch plate 110 is mounted on a housing 160, positioned between outside guides 166. FIG. 19 shows an isolated perspective view of the housing. A washer assembly 165 mounted on the housing 160 is positioned in a central opening 113 in the main body 116 of the latch plate to slidably guide the latch plate. A wire spring 117 is mounted to the housing at wire spring mount 168. The spring urges spring retainer 114 in one direction so that the latch plate is urged from a disengaging position toward an engaging position. The latch plate has flanges 112 which abut against the bumper 81 of the memory register 76 when the latch plate is in the disengaging position, thereby resisting movement of the latch plate toward its engaging position. While the upper track is in the initial position the latch plate stays in the engaging position. Only when the upper track is slid towards a free position can the latch plate lock member 111 move through opening 167 in the housing and engage the plunger 150 at plunger pocket 151. This holds the plunger, preventing it from moving down into the engaging position. The lock member 111 also therefore holds the cam lever in the operating position.

Cam lock-out tab 103 is shaped so as to engage tab 46 on the latch lever 42 when the upper track returns from the free position to the initial position if (due to manufacturing tolerance errors or deflection) the latch windows 45 of the upper track 50 are not precisely aligned with the latch teeth 56 of the lower track 55. In a highly advantageous feature, the cam lock-out tab engages tab 46 until the master latch returns to the latching position, thereby preventing return of the cam lever to the first position until the master latch has returned to the latching position. At that point the tabs are able to pass one another. Preferably cam tab 103 is shaped so as not to interfere with the master latch lever 42 during comfort adjustment.

Figure 20:
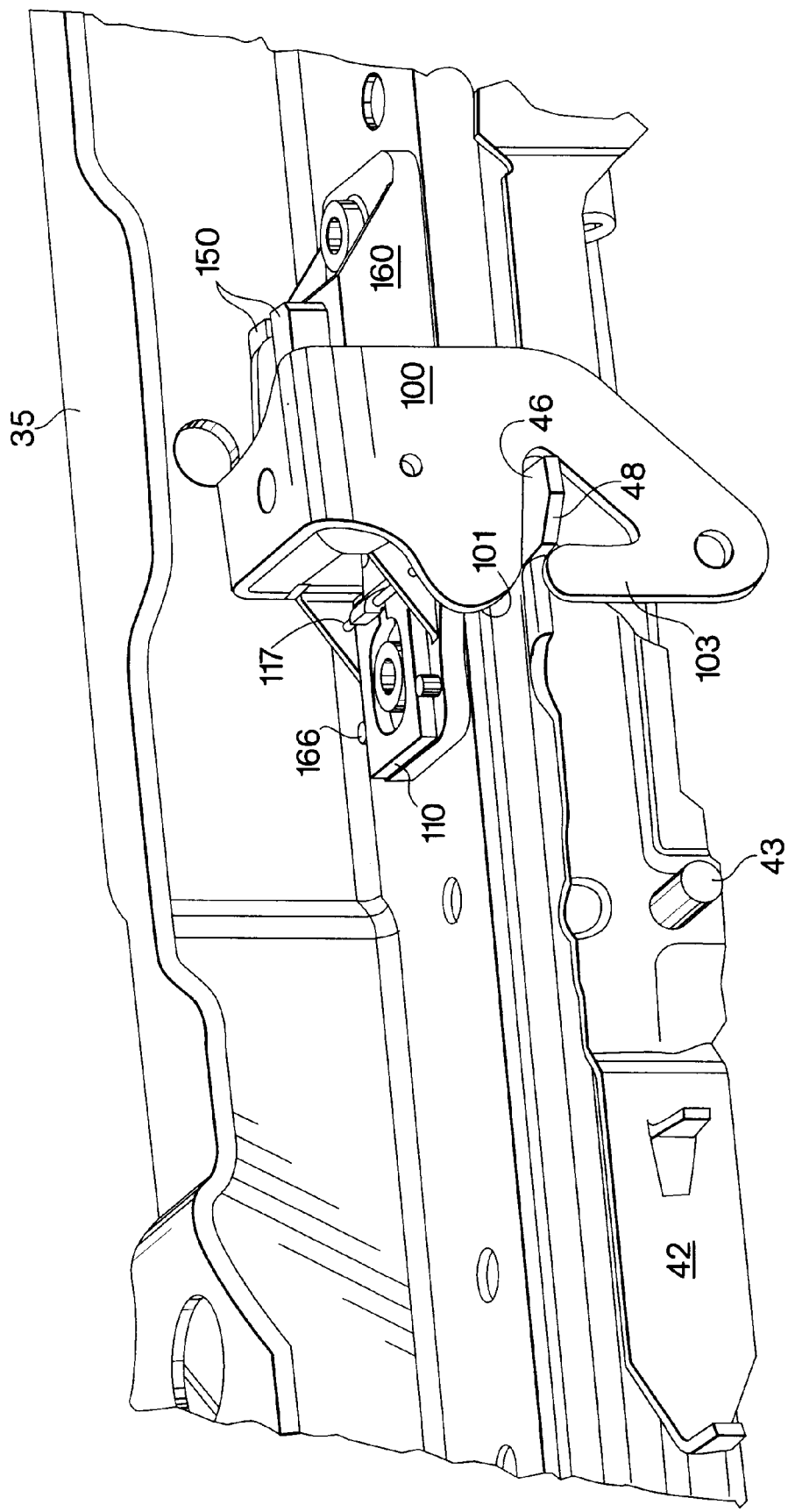
Figure 21:
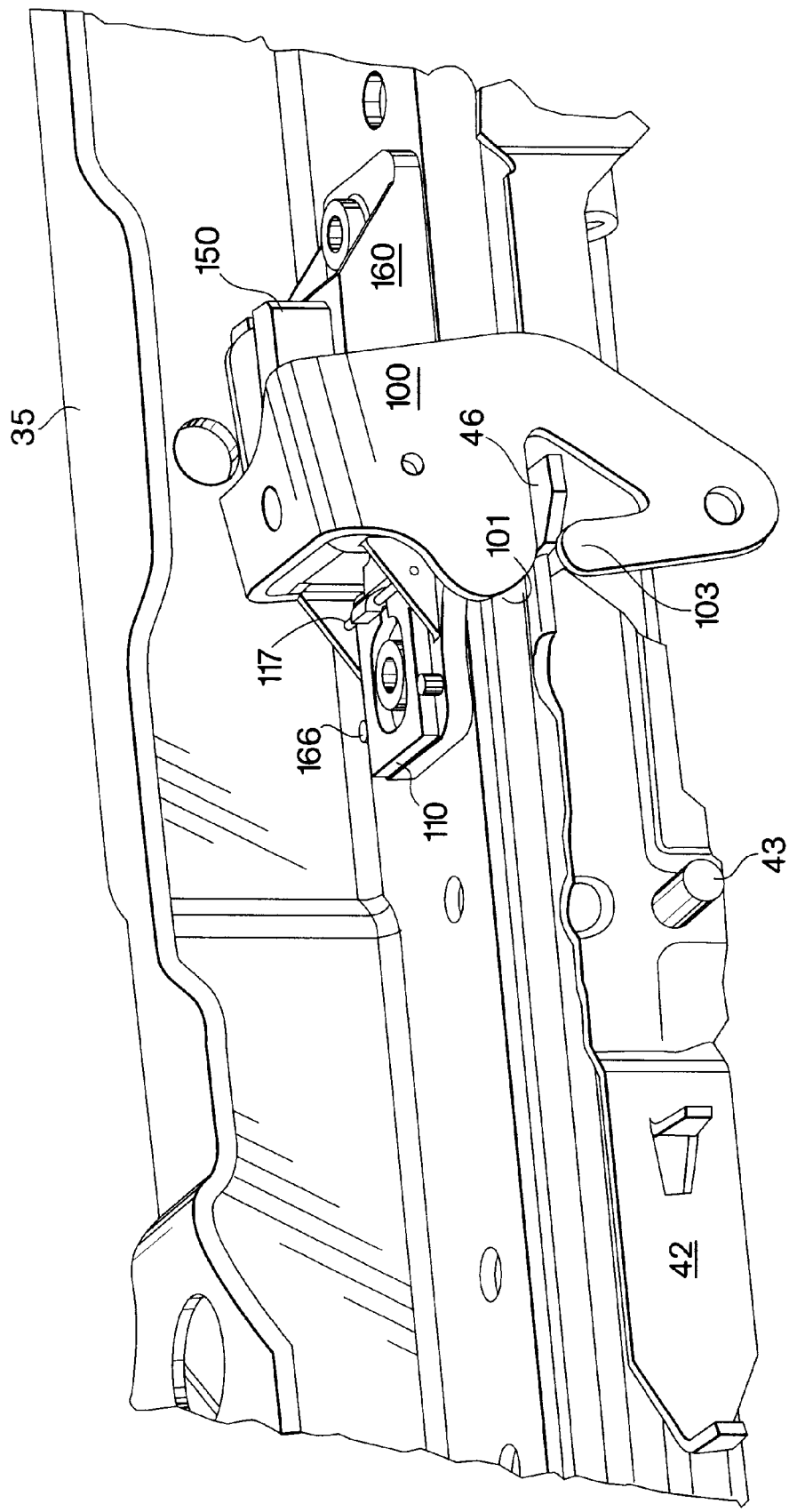
Figure 22:
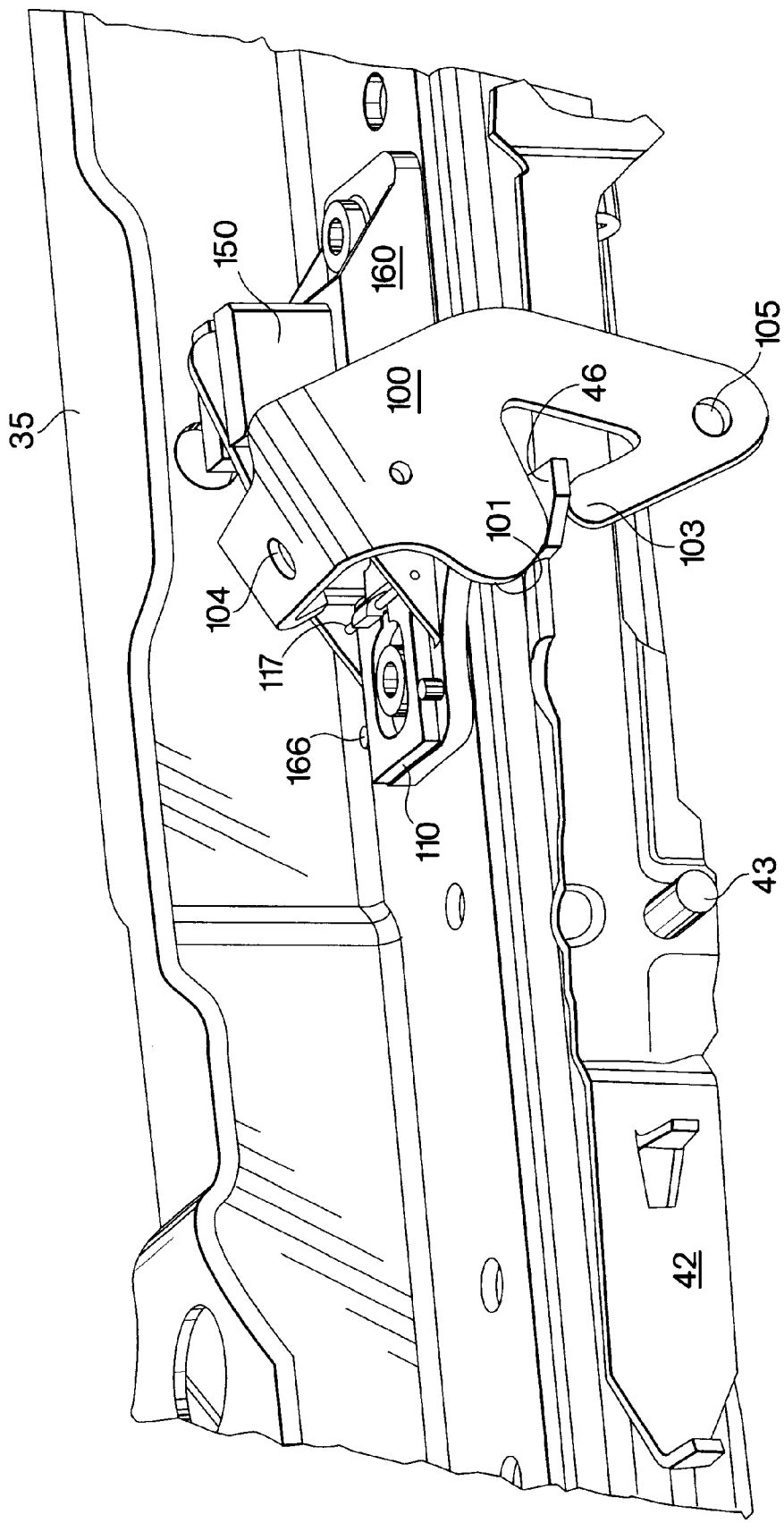
Figure 23:
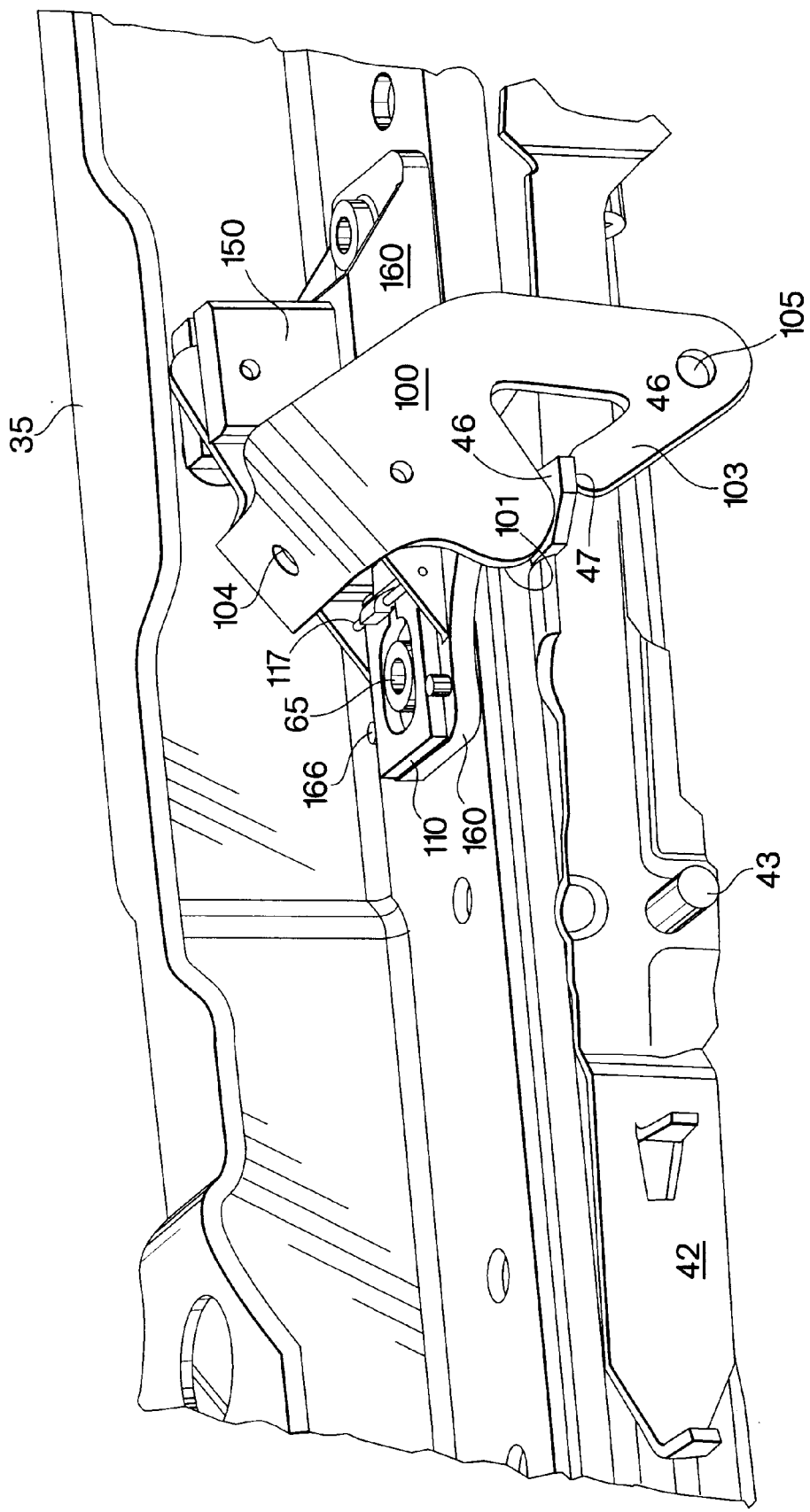
Figure 24:
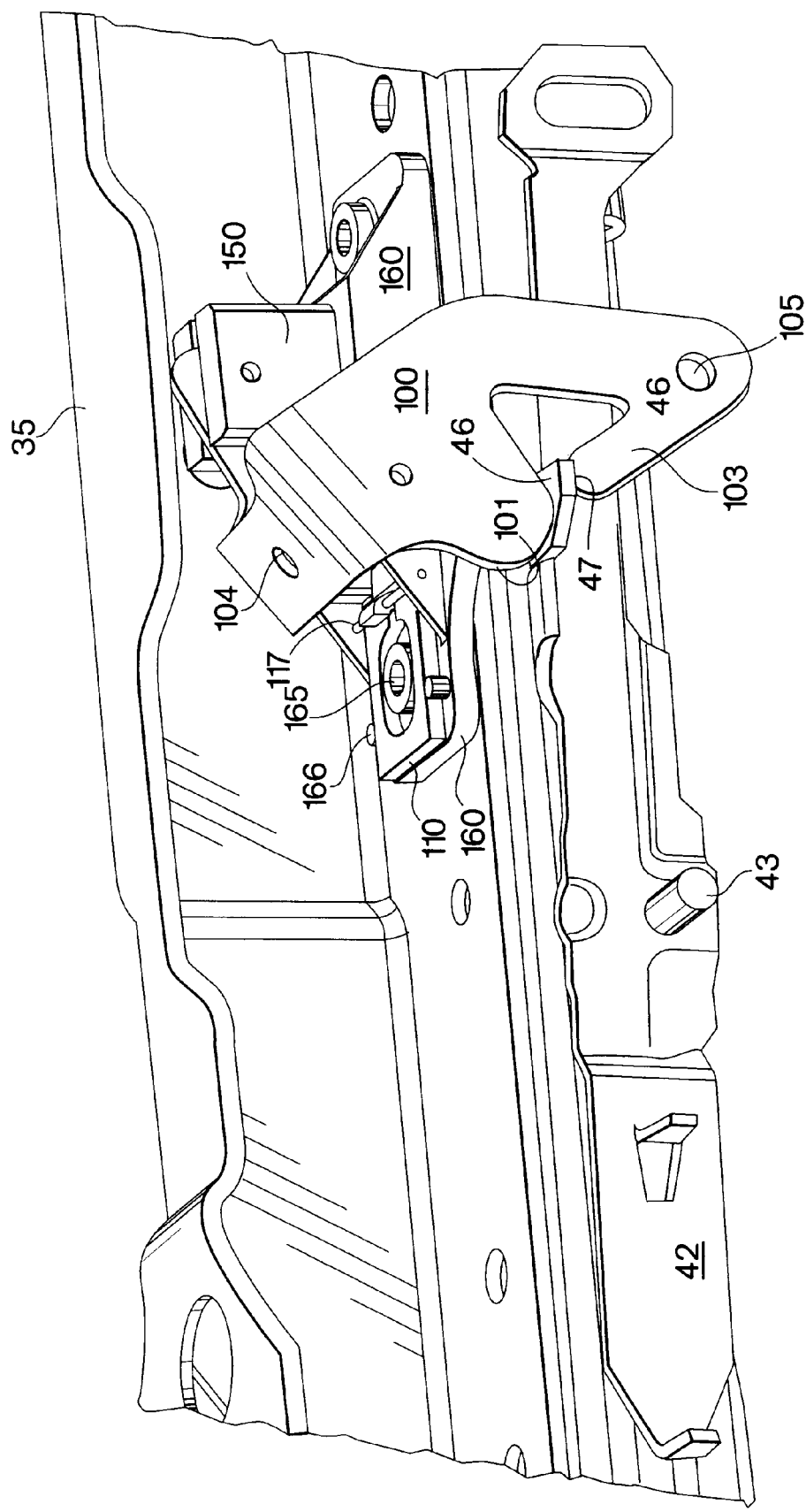

FIGS. 20–24 show the alternative preferred embodiment moving from an initial position in which the cam lever 100 is in the first position to a free position. In FIG. 20, the cam lever 100 is at the first position, the master latch assembly 40 is in the latching position, securing the upper track with respect to the lower track at the initial position, the plunger is in the engaging position, the memory register is in the normal condition, allowing it to be slid along the rod in response to comfort adjustment, and the latch plate is in the disengaging position. FIG. 21 shows the cam lever with some rotation from the first position in response to rotation of the seat back (not shown) towards the full down position. At this point just the cam lever and the plunger have moved. In FIG. 22 the cam lever has rotated so that the cam surface 101 has contacted the tab 47 of the latch lever 42. The plunger has risen, but the latch plate 110 cannot move as the memory register restricts motion in the direction the wire spring 117 is biasing the latch plate. As in the previous embodiment, preferably the order of disengagement and reengagement is first the memory register is disengaged (moved to the memory position), then the master latch assembly is disengaged (moved to the unlatching position). Then, after easy entry, the master latch assembly reengages first (returns to the latching position) and then the memory register is reengaged (returned to the normal condition). In FIG. 23 the master latch is in the unlatching position, the plunger is in the disengaging position, and the cam lever is in the operating position. However, as the upper track 50 has not moved, the latch plate is still in the disengaging position. Only upon movement of the upper track to the free position (FIG. 24) is the latch plate permitted to slide to the engaging position contacting the plunger and thereby holding the plunger in the disengaging position until the upper track returns to the initial position.

From the foregoing disclosure and detailed description of certain preferred embodiments, it will be apparent that various modifications, additions and other alternative embodiments are possible without departing from the true scope and spirit of the invention. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A seat track assembly comprising, in combination:
   a lower track assembly comprising a lower track;
   an upper track assembly comprising an upper track slidable in forward and rearward directions over the lower track;
   a master latch mounted on the upper track assembly and movable from a latching position to an unlatching position, in the latching position releasably securing the upper track at an adjustable initial position with respect to the lower track;
   a rod affixed to the lower track assembly;
   a memory register comprising a wrap spring wrapped around the rod, wherein in a normal condition the wrap spring is slidably adjustable with respect to the rod, and in a memory position the wrap spring wraps tightly around the rod; and
   memory actuation means for moving the memory register between the normal condition and the memory position and for moving the master latch between the latching position and the unlatching position, comprising:
      a cam lever mounted on the upper track assembly and rotatable from a first position to an operating position, in the first position the wrap spring is slidably adjustable with respect to the rod, and in response to rotation of the cam lever to the operating position the master latch is moved to the unlatching position, the memory register is moved to the memory position, and the upper track is free to slide over the lower track from the initial position to a free position;
   wherein the memory register stays in the memory position and the master latch is held in the unlatching position until the upper track returns from the free position to the initial position, where the memory actuation means engages the memory register to release the master latch to the latching position, the memory register to the normal condition, and the cam lever to the first position.

2. The seat track assembly of claim 1 wherein upon return of the upper track to the initial position the memory actuation means releases the master latch to the latching position before the memory register is released to the normal condition.

3. The seat track assembly of claim 1 wherein rotation of the cam lever to the operating position moves the memory actuation means so as to urge the memory register to move to the memory position before the master latch is urged to the unlatching position.

4. The seat track assembly of claim 1 wherein the lower track has a plurality of teeth and the master latch has at least one latch window which engages a corresponding tooth when the master latch is in the latching position.

5. The seat track assembly of claim 4 wherein the master latch is pivotably engageable with the teeth of the lower track and has a pair of latch windows, the latch windows being aligned so as to engage each tooth substantially simultaneously as the master latch moves into the latching position.

6. The seat track assembly of claim 1 wherein a spring urges the master latch toward the latching position.

7. The seat track assembly of claim 1 wherein the cam lever is pivotable about a pivot pin mounted on the upper track assembly.

8. The seat track assembly of claim 1 wherein a spring connects the upper track assembly to the cam lever, biasing the cam lever towards the first position.

9. The seat track assembly of claim 1 wherein the memory actuation means has a surface which contacts a tab on the master latch as the cam lever pivots toward the operating position, urging the master latch into the unlatching position.

10. The seat track assembly of claim 1 wherein the memory actuation means has fore and aft faces, and each face engages a corresponding end of the wrap spring when the cam lever is in the first position.

11. The seat track assembly of claim 1 wherein the memory register further comprises a bracket slidable on the rod, and the wrap spring is positioned within the bracket.

12. The seat track assembly of claim 11 wherein the bracket has first and second ends and the memory actuation means has front and rear faces and the faces of the memory actuation means urge corresponding ends of the bracket to thereby move the memory register in forward and rearward directions in response to movement of the upper track in forward and rearward directions.

13. The seat track assembly of claim 11 further comprising a pair of elastomeric bumpers, each bumper positioned between the wrap spring and an end of the bracket.

14. The seat track assembly of claim 1 wherein the upper track and lower track define a central channel between the tracks, and the rod is positioned in the central channel.

15. The seat track assembly of claim 1 further comprising a plunger attached to the cam lever, movable from an engaging position where the plunger engages the wrap spring to hold the memory register in the normal condition, to a disengaging position where the plunger does not engage the wrap spring, allowing the memory register to move to the memory condition.

16. The seat track assembly of claim 15 wherein the upper track assembly further comprises a housing having an opening, and an upper riser having an opening aligned with the housing opening, and the upper track has an opening aligned with the housing opening to define a passage, and the plunger is at least partially positioned in the passage.

17. The seat track assembly of claim 15 wherein the plunger has downwardly facing contact faces and a central opening between the contact faces, wherein the contact faces engage first and second ends of the wrap spring, and the rod is positioned at least partially in the central opening when the plunger is in the engaging position.

18. The seat track assembly of claim 15 wherein the plunger has shoulders and front and rear faces, and the memory register further comprises a U-shaped bracket having first and second ends;

the shoulders being seated on the first and second ends to restrict further movement of the plunger toward the memory register when the plunger is in the engaging position; and the front and rear face each urge the first and second ends, respectively of the bracket to move the memory register in a forward and rearward direction, respectively in response to movement of the upper track when the plunger is in the engaging position.

19. The seat track assembly of claim 15 wherein the cam lever is pivotably connected to the plunger with a plunger pivot pin.

20. The seat track assembly of claim 1 wherein the cam lever has a lock-out tab, the master latch has a lock-out tab, and the cam lever lock-out tab engages the master latch lock-out tab to prevent return of the memory register to the normal condition until the master latch has returned to the latching position.

21. The seat track assembly of claim 1 wherein the memory actuation means further comprises a latch mechanism which holds the cam lever in the operating position until the upper track returns to the initial position.

22. The seat track assembly of claim 21 wherein the latch mechanism comprises a latch plate slidably mounted on the upper track assembly, movable from a disengaging position when the cam lever is in the first position to an engaging position as the cam lever moves to the operating position.

23. The seat track assembly of claim 22 wherein a spring mounted on the upper track assembly urges the latch plate toward the engaging position.

24. The seat track assembly of claim 23 further comprising a plunger having a pocket attached to the cam lever, wherein rotation of the cam lever from the first position to the operating position moves the plunger from an engaging position where the plunger engages the memory register to a disengaging position where the plunger does not engage the memory register, and the latch plate engages the plunger pocket, holding the plunger in the disengaging position.

25. The seat track assembly of claim 24 wherein the memory register further comprises a bracket slidable on the rod, positioned adjacent the wrap spring, and having first and second ends, and the latch plate has a pair of flanges, wherein the latch plate in the engaging position restricts return of the cam lever to the first position, and the flanges contact the memory register as the upper track returns to the initial position to urge the latch plate out of the plunger pocket and back to the disengaging position.

26. The seat track assembly of claim 22 wherein the latch plate is in the engaging position when the upper track is in the free position and the cam lever is in the operating position.

27. The seat track assembly of claim 22 wherein the memory register further comprises an elastomeric bumper slidable on the rod contacting the bracket and the flanges of the latch plate when the latch plate is in the disengaging position.

28. The seat track assembly of claim 21 wherein the latch mechanism comprises a latch-lock lever having a hook and a distal end, pivotably mounted on the upper track assembly between a normal position where the distal end contacts the memory register, and a second position when the upper track is moved to the free position where the distal end is out of contact with the memory register.

29. The seat track assembly of claim 28 wherein the latch-lock mechanism further comprises a spring connecting the latch-lock lever to the upper track assembly, urging the distal end of the latch-lock lever toward the memory register.

30. The seat track assembly of claim 28 wherein a cam lever return spring urges the cam lever towards the first position.

31. The seat track assembly of claim 30 wherein as the upper track slides in the forward direction away from the initial position the hook engages a hook tab of the cam lever to prevent rotation of the cam lever toward the first position and prevent return of the plunger to the engaging position.

32. The seat track assembly of claim 31 wherein as the upper track returns to the initial position the distal end of the latch-lock lever contacts the memory register, the hook moves out of engagement with the hook tab, and the master latch assembly returns to the latching position.

33. The seat track assembly of claim 28 wherein the latch-lock lever is in the second position when the upper track is in the free position and the cam lever is in the operating condition.

34. The seat track assembly of claim 28 wherein the memory register further comprises an elastomeric bumper slidable on the rod contacting the bracket and the distal end of the latch-lock lever when the latch-lock lever is in the normal position.

35. The seat track assembly of claim 1 further comprising a cable attached to the cam lever, wherein a force on the cable moves the cable and pulls the cam lever from the first position to the operating position.

36. A seat track assembly mounted in a motor vehicle comprising, in combination:

a fixed lower track assembly comprising first and second elongate lower tracks aligned generally parallel with one another, each lower track having a flange provided with a series of teeth;

an upper track assembly comprising a first elongate upper track and a second elongate upper track longitudinally slidingly engaging the first and second lower track, respectively, wherein a central channel is defined between each upper track and its corresponding lower track;

a master latch pivotably mounted on each upper track, having a pair of latch levers with latch windows, each latch lever having a corresponding spring and a corresponding cam tab, each latch lever biased by its corresponding spring towards a latching position wherein the latch windows engage the latch teeth on a corresponding lower track, the master latch assembly substantially simultaneously releasably securing the upper tracks at an initial position with respect to the corresponding lower tracks, and movable to an unlatching position where the latch windows do not engage the latch teeth, allowing the upper tracks to slide over the lower tracks to a free position;

a rod affixed to each lower track in the corresponding central channel;

a pair of memory registers each slidable along a corresponding rod in a normal condition and movable with a corresponding upper track and each memory register being positioned in a corresponding central channel and comprising:

a wrap spring wrapped around the rod, normally slidable over the rod, and a bracket slidable on the rod, having first and second ends and openings in each end sized to slidingly receive the rod, wherein the wrap spring is positioned between the first and second ends;

a plunger engaging the wrap spring at an engaging position in which the wrap spring is slidable over the rod, and disengaging the wrap spring in a disengaging position, allowing the wrap spring to wrap tightly around the rod, preventing relative movement of the wrap spring with respect to the rod;

a cam lever having a cam surface, pivotably attached to the plunger, rotatable from a first position to an operating position, wherein rotation towards the operating position moves the plunger to the disengaging position and continued rotation of the cam lever to the operating position urges the cam surface against the cam tab, moving the master latch assembly to the unlatching position;

wherein each cam lever is held in the operating position when the upper tracks are in the free position; and as the upper tracks return from the free position to the initial position the cam surfaces move out of engagement with the master latch cam tabs, each master latch lever returns to the latching position and each cam lever returns to the first position urging each plunger to reengage the corresponding wrap spring.

37. The seat track assembly of claim 36 wherein each latch lever has a lock-out tab and each cam lever has a lock-out tab, and the lock-out tab of each latch lever engages the lock-out tab of the corresponding cam lever after the cam surface has disengaged the latch lever to prevent each cam lever from returning each plunger to the engaging position until after each latch lever returns to the latching position.

38. The seat track assembly of claim 36 wherein the master latch further comprises a towel bar connecting the latch levers so that the latch levers operate substantially simultaneously.

39. The seat track assembly of claim 36 further comprising front and rear lower risers rigidly attached to each lower track.

40. The seat track assembly of claim 36 further comprising an upper riser affixed to each upper track.

41. The seat track assembly of claim 36 further comprising a cam lever return spring biasing each cam lever towards the first position.

42. The seat track assembly of claim 36 further comprising a pivotable latch-lock lever mounted on the upper track assembly and engaging each memory register, the latch-lock lever having a hook, where in a normal position the latch-lock lever contacts the memory register, and in response to movement of the upper tracks to the free position the latch-lock lever spring urges the latch-lock lever to a second position where the hook engages a hook tab extending from the cam lever, holding the cam lever in the operating position while the upper tracks are in the free position.

43. The seat track assembly of claim 42 wherein movement of the upper tracks from the free position toward the initial position moves each latch-lock lever into contact with the corresponding memory register, pivoting the hook out of engagement with the hook tab, allowing the cam surface to disengage the latch-lock lever, and thereby allowing the master latch lever windows to reengage the latch teeth.

44. The seat track assembly of claim 36 further comprising a latch plate slidably mounted on the upper track assembly, movable from a disengaging position when the cam lever is in the first position to an engaging position as the cam lever moves to the operating position.

45. The seat track assembly of claim 44 wherein a spring mounted on the upper track assembly urges the latch plate toward the engaging position.

46. The seat track assembly of claim 45 wherein rotation of the cam lever from the first position to the operating position moves the plunger to the disengaging position and the latch plate engages a plunger pocket formed on the plunger, holding the plunger in the disengaging position.

47. The seat track assembly of claim 46 wherein the latch plate has a pair of flanges and the latch plate in the engaging position restricts return of the cam lever to the first position, and the flanges contact the memory register as the upper track returns to the initial position to urge the latch plate out of the plunger pocket and back to the disengaging position.

48. The seat track assembly of claim 36 further comprising:

an upper riser affixed to each upper track;

a seat base attached to the upper risers;

a seat back pivotable from a full up position to a full down position;

a pair of recliners pivotably connecting the seat back to the seat base; and a pair of front and back lower risers, each pair attached to a corresponding lower seat track, cooperating with the upper risers to raise and establish the angle of the seat base.

49. The seat track assembly of claim 48 further comprising a cable connecting each recliner to a corresponding one of the cam levers;

wherein rotation of the seat back to the full-down position pulls on each cable which in turn pulls each cam lever to the operating position.

50. The seat track assembly of claim 49 wherein the memory registers stay in the memory position and the latch levers stay in the unlatching position until the seat back is returned to the full-up position and the upper track returns from the free position to the initial position.

51. A seat track assembly comprising, in combination:

a lower track assembly comprising a lower track;

an upper track assembly comprising an upper track slidable in forward and rearward directions over the lower track;

a master latch mounted on the upper track assembly and movable from a latching position to an unlatching position, in the latching position releasably securing the upper track at an adjustable initial position with respect to the lower track;

a rod affixed to the lower track assembly;

a memory register comprising a wrap spring wrapped around the rod, wherein in a normal condition the wrap-spring is slidably adjustable with respect to the rod, and in a memory position the wrap spring wraps tightly around the rod;

memory actuation means for moving the memory register between the normal condition and the memory position and for moving the master latch between the latching position and the unlatching position, comprising:

a cam lever mounted on the upper track assembly and rotatable from a first position to an operating position, in the first position the wrap spring is slidably adjustable with respect to the rod, wherein in response to rotation of the cam lever to the operating position the master latch is moved to the unlatching position, the memory register is moved to the memory position, and the upper track is free to slide over the lower track from the initial position to a free position; and the memory actuation means comprises a means for returning the master latch to the latching position and for returning the cam lever to the first position, actuated by return of the upper track from the free position to the initial position.

* * * * *